US012566978B2

(12) United States Patent
Wanage et al.

(10) Patent No.: US 12,566,978 B2
(45) Date of Patent: Mar. 3, 2026

(54) ANALYTICS RULES ENGINE FOR SELECT TRANSACTION IDENTIFICATION

(71) Applicant: Mastercard International Incorporated, Purchase, NY (US)

(72) Inventors: Shraddha Wanage, Brooklyn, NY (US); Brijesh Garabadu, Sandy, UT (US); Kunal Ojha, Salt Lake City, UT (US); Daman Bareiss, Salt Lake City, UT (US); Ashley Guinan, Cottonwood Heights, UT (US); Gerald Ashby, Lehi, UT (US)

(73) Assignee: Mastercard International Incorporated, Purchase, NY (US)

( * ) Notice: Subject to any disclaimer, the term of this patent is extended or adjusted under 35 U.S.C. 154(b) by 305 days.

(21) Appl. No.: 18/314,051

(22) Filed: May 8, 2023

(65) Prior Publication Data

US 2024/0378466 A1 Nov. 14, 2024

(51) Int. Cl.
G06N 5/025 (2023.01)
G06F 9/54 (2006.01)
G06Q 30/0283 (2023.01)

(52) U.S. Cl.
CPC .............. G06N 5/025 (2013.01); G06F 9/54 (2013.01); G06Q 30/0283 (2013.01)

(58) Field of Classification Search
CPC ...... G06N 5/025; G06F 9/54; G06Q 30/0283; G06Q 40/12
See application file for complete search history.

(56) References Cited

U.S. PATENT DOCUMENTS

| 9,286,639 B1 * | 3/2016 | Patzer .................... G06Q 40/10 |
| 10,956,974 B2 * | 3/2021 | Rand .................... G06Q 20/387 |

(Continued)

FOREIGN PATENT DOCUMENTS

| CN | 113011967 | 6/2021 |
| CN | 113870033 | 12/2021 |
| KR | 10-20220074327 | 6/2022 |

OTHER PUBLICATIONS

International Search Report and Written Opinion for PCT Application No. PCT/US2024/019325 (Dated Jul. 5, 2024).

(Continued)

*Primary Examiner* — Michael Jared Walker
(74) *Attorney, Agent, or Firm* — Hovey Williams LLP

(57) ABSTRACT

A system is configured to retrieve a set of raw transaction data. A transaction categorization model is applied to the raw transaction data. The transaction categorization model infers a category from each transaction and labels each transaction with the inferred category. An entity recognition model is applied to the labelled transaction data. The entity recognition model extracts an entity from each transaction and labels each transaction with the extracted entity. The system generates a plurality of transaction streams from the labelled transactions based on the category and entity labels. The system also labels each transaction stream with either a revenue label or a non-revenue label based on an analysis of the types of transactions defining the transaction stream. The system trains a supervised-based neural network using the labelled transaction streams to generate a revenue stream classifier model.

20 Claims, 8 Drawing Sheets

(56)                References Cited

U.S. PATENT DOCUMENTS

| | | | | |
|---|---|---|---|---|
| 11,107,085 B2 * | 8/2021 | Ivakhnenko | ........... | G06N 20/00 |
| 11,416,926 B1 * | 8/2022 | Showalter | ............. | G06Q 10/10 |
| 11,475,456 B2 * | 10/2022 | Ponniah | ............. | G06Q 20/4016 |
| 11,748,758 B2 * | 9/2023 | Adjaoute | ............... | G06N 20/00 |
| | | | | 705/35 |
| 2008/0147731 A1 * | 6/2008 | Narayana | ............... | G06Q 30/02 |
| 2009/0164391 A1 * | 6/2009 | Otto | ....................... | G06N 5/025 |
| | | | | 706/45 |
| 2011/0282791 A1 * | 11/2011 | Anderson | ............. | G06Q 40/00 |
| | | | | 705/35 |
| 2015/0026035 A1 * | 1/2015 | Showalter | ............. | G06Q 40/06 |
| | | | | 705/38 |
| 2020/0134716 A1 * | 4/2020 | Lahrichi | ................. | G06N 5/01 |
| 2020/0294139 A1 * | 9/2020 | Cella | .................... | G06F 18/241 |
| 2020/0302396 A1 * | 9/2020 | Xiao | .................... | G06Q 10/067 |
| 2020/0334680 A1 * | 10/2020 | Vanga | ................... | G06F 21/554 |
| 2021/0081979 A1 * | 3/2021 | Taira | .................. | G06Q 30/0605 |
| 2021/0390385 A1 * | 12/2021 | Saleh | ..................... | G06N 3/084 |
| 2022/0398573 A1 * | 12/2022 | Robinson | ............ | G06F 16/3335 |
| 2023/0070176 A1 * | 3/2023 | Scavo | .................... | G06Q 40/04 |
| 2023/0222531 A1 * | 7/2023 | Cella | ................. | G06Q 10/0631 |
| | | | | 705/7.31 |
| 2023/0351194 A1 * | 11/2023 | Wright | ................. | G06F 16/285 |
| 2023/0351383 A1 * | 11/2023 | Bar Eliyahu | .......... | G06Q 40/12 |
| 2023/0351415 A1 * | 11/2023 | Green | ............... | G06Q 30/0201 |
| 2023/0351416 A1 * | 11/2023 | Green | ............... | G06Q 30/0204 |
| 2024/0037557 A1 * | 2/2024 | Stankey | ................. | G06Q 40/06 |
| 2024/0037579 A1 * | 2/2024 | Stankey | ................. | G06N 3/045 |

OTHER PUBLICATIONS

International Search Report and Written Opinion for PCT Application No. PCT/US2024/019333 (Dated Jul. 12, 2024).

* cited by examiner

ANALYTICS RULES ENGINE FOR SELECT TRANSACTION IDENTIFICATION

RELATED APPLICATIONS

The present application is filed contemporaneously with U.S. patent application Ser. No. 18/314,044, entitled ANALYTICS RULES ENGINE FOR CREDIT TRANSACTION STACKING IDENTIFICATION. The entire disclosure of the aforementioned contemporaneously filed application is hereby incorporated herein by reference.

FIELD OF THE DISCLOSURE

The field of the disclosure relates generally to machine learning and, more particularly, to training and applying an analytics rules engine within a transaction system to identify select transactions and/or credit transaction stacking activities.

BACKGROUND

Managing cash flow is a difficult aspect of owning a business and is identified as a leading cause of financial problems in a business. Limited resources, unoptimized operations, and a lack of financial tools play a large role in cash flow management failure. Businesses do not always use the most effective cash flow management strategy for their company. Often, a business may need to receive a loan to maintain operations, expand facilities, increase inventory, etc. A lender, however, needs to assess the business's capacity of repaying the loan before proceeding to lend the business money. An important aspect is determining whether the business is maintaining consistent revenue streams. The lender may prefer to see a consistent flow of revenue from multiple clients.

Furthermore, a lender needs to assess additional risks associated with the business. One issue that the lending industry faces today is credit stacking or loan stacking activities. Credit or loan stacking happens when a borrower has multiple lines of credit and/or loans outstanding at the same time. People use these terms most often when borrowers apply for and receive approval on several short-term business loans and/or lines of credit in short succession. In this case, the credit/loan applicant is not refinancing one loan with another but taking out multiple loans at once—hence, stacking them. Having simultaneous loans and/or line or credit can negatively impact a borrower's ability to afford new payments. And if the borrower defaults, the presence of multiple creditors can make it difficult for each lender to get their money back. A potential lender is typically unable to assess credit/loan stacking activities and gather an accurate picture of all revenue streams associated a business.

The field of artificial intelligence (AI) includes systems and methods that allow a computer to interpret external data, "learn" from that data, and apply that knowledge to a particular end. One tool of AI, inspired by biological neural networks, is artificial neural networks. An artificial neural network (or just "neural network," for simplicity) is a computer representation of a network of nodes (or artificial neurons) and connections between those nodes that, once the neural network is "trained," can be used for predictive modeling. Neural networks typically have an input layer of nodes representing some set of inputs, one or more interior ("hidden") layers of nodes, and an output layer representing one or more outputs of the network. Each node in the interior layers is typically fully connected to the nodes in the layer before and the layer after by edges, with the input layer of nodes being connected only to the first interior layer, and with the output layer of nodes being connected only to the last interior layer. The nodes of a neural network represent artificial neurons and the edges represent a connection between two neurons.

Further, each node may store a value representative of some embodiment of information, and each edge may have an associated weight generally representing a strength of connection between the two nodes. Neural networks are typically trained with a body of labeled training data, where each set of inputs in the training data set is associated with known output value (the label for those inputs). For example, during training, a set of inputs (e.g., several input values, as defined by the number of nodes in the input layer) may be applied to the neural network to generate an output (e.g., several output values, as defined by the number of nodes in the output layer). This output is unlikely to match the given label for that set of inputs since the neural network is not yet configured. As such, the output is then compared to the label to determine differences between each of the output values and each of the label values. These differences are then backpropagated through the network, changing the weights of the edges and the values of the hidden nodes such that the network will better conform to the known training data. This process may be repeated many thousands of times or more, based on the body of training data, configuring the network to better predict particular outputs given particular inputs. As such, the neural network becomes a "mesh" of information embodied by the nodes and the edges, an information network that, when given an input, generates a predictive output.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes a database storing historical raw transaction data, a machine learning component, a processor, and a memory storing computer-executable instructions thereon. The machine learning component includes a communications module, a data preparation engine, a modeling engine, a model application engine, and a results engine. The computer-executable instructions, when executed by the processor, cause the processor to retrieve, via the communications module, a first set of raw transaction data from the database. The first set of raw transaction data includes a first plurality of first transactions. The processor applies, via the model application engine, a transaction categorization model to the first set of raw transaction data. The transaction categorization model infers a category from each first transaction of the first plurality of first transactions and labels each first transaction with the respective inferred category to generate a first set of category-labelled transaction data. The processor also applies, via the model application engine, an entity recognition model to the first set of category-labelled transaction data. The entity recognition model extracts an entity from each first transaction of the first set of category-labelled transaction data and labels each first transaction with the respective extracted entity to generate a first set of transaction training data. Furthermore, the processor generates, via the data preparation engine, a plurality of first transaction streams from the first set of transaction training data. Each respective first transaction stream includes a group of first transactions that include one or more of the following: a same category label and a same entity label. Additionally, the processor determines, for each respective first transaction stream, whether the respective first transaction stream is indicative of a revenue stream or a non-revenue stream. The processor applies, via the data preparation engine, a revenue label to each first transaction stream and associated group of first transactions determined to be indicative of a revenue stream, and applies a non-revenue label to each first transaction stream and associated group of first transactions determined to be indicative of a non-revenue stream. Moreover, the processor trains, via the modeling engine, a supervised-based neural network using the plurality of labelled first transaction streams to generate a revenue stream classifier model.

In another aspect, a method is provided. the method includes retrieving a first set of raw transaction data from a database. The first set of raw transaction data includes a first plurality of first transactions. The method also includes applying a transaction categorization model to the first set of raw transaction data. The transaction categorization model infers a category from each first transaction of the first plurality of first transactions and labels each first transaction with the respective inferred category to generate a first set of category-labelled transaction data. Furthermore, the method includes applying an entity recognition model to the first set of category-labelled transaction data. The entity recognition model extracts an entity from each first transaction of the first set of category-labelled transaction data and labels each first transaction with the respective extracted entity to generate a first set of transaction training data. Additionally, the method includes generating a plurality of first transaction streams from the first set of transaction training data. Each respective first transaction stream includes a group of first transactions that include one or more of the following: a same category label and a same entity label. Furthermore, the method includes determining, for each respective first transaction stream, whether the respective first transaction stream is indicative of a revenue stream or a non-revenue stream. The method also includes applying a revenue label to each first transaction stream and associated group of first transactions determined to be indicative of a revenue stream, and applying a non-revenue label to each first transaction stream and associated group of first transactions determined to be indicative of a non-revenue stream. Additionally, the method includes training a supervised-based neural network using the plurality of labelled first transaction streams to generate a revenue stream classifier model.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and various aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the phrase "machine learning" includes statistical techniques to give computer systems the ability to "learn" (e.g., progressively improve performance on a specific task) with data, without being explicitly programmed for that specific task. The phrases "neural network" (NN) and "artificial neural network" (ANN), used interchangeably herein, refer to a type of machine learning in which a network of nodes and edges is constructed that can be used to predict a set of outputs given a set of inputs.

Exemplary System

Figure 1:
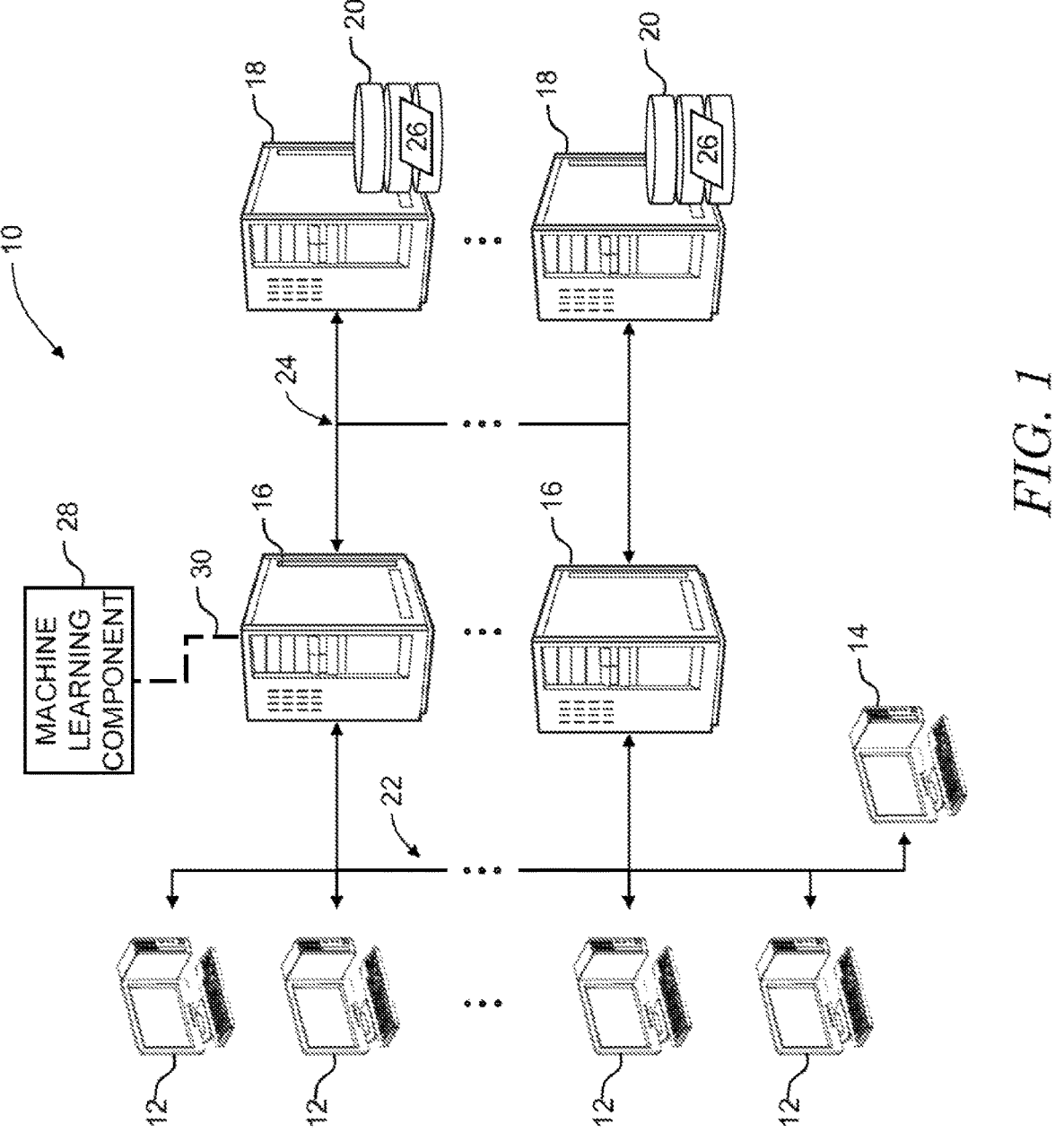
FIG. 1 is a schematic of an exemplary computing system for training and applying one or more machine learning models to classify transaction streams as revenue or non-revenue and identify credit stacking activities, according to one aspect of the present invent.

FIG. 1 is a schematic of an exemplary computing system 10 for training and applying one or more machine learning models to classify transaction streams as revenue or non-revenue and identify credit/loan stacking activities, according to one aspect of the present invention. In some embodiments, the computing system 10 may be part of a multi-party payment processing system or network, or an interchange network (e.g., a payment processor such as Mastercard®). Embodiments described herein may relate to a payment card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.)

In the example embodiment, the computing system 10 includes one or more computing devices 12 and 14; one or more application servers 16; one or more database servers 18, each electronically interfaced to one or more respective databases 20 (broadly, data sources); at least one machine learning component 28 (broadly, an analytics rules engine); and one or more communication networks, such as networks 22 and 24. In an example embodiment, one or more of the computing devices 12, 14, the application servers 16, and the machine learning component 28 may be located within network boundaries (e.g., the network 22) of an organization, such as a business, a corporation, a government agency and/or office, a university, or the like. The communication network 24 and the database servers 18 may be located remote and/or external to the organization. In some embodiments, the database servers 18 may be provided by third-party data vendors managing the databases 20. It is noted that the location of the computing devices 12 and 14, the application servers 16, the database servers 18, the machine learning component 28, and the databases 20 can all be located in a single organization or separated, in any desirable and/or selected configuration or grouping, across more than one organization (e.g., a third-party vendor). For example, in an example embodiment, the computing devices 12 can be remote computing devices, each associated with a customer, electronically interfaced in communication to the application servers 16 and the machine learning component 28, which may be located within an organization. In addition, the database servers 18 and associated databases 20 can be located within the same organization or a separate organization. While depicted as separate networks, the communication networks 22 and 24 can include a single network system, such as the Internet.

In the exemplary embodiment, the computing devices 12, 14, the application servers 16, and the machine learning component 28 are electronically interfaced in communication via the communication network 22. In an example embodiment, the computing devices 12, 14 are electronically interfaced in communication with the machine learning component 28 via one or more application programming interfaces (APIs) 30 (e.g., a REST API, etc., or multiple such APIs) exposed by the application servers 16 to the computing devices 12, 14 (as indicated by the dotted line in FIG. 1). The API 30 abides by types, formats, and/or protocols specific to the application servers 16. The API 30 is configured to provide, for example and without limitation, a "Request Cash Flow Analytics" operation (e.g., request a report identifier (ID) and a report PIN used to fetch the requested analytics report) and a "Get Cash Flow Analytics" operation (e.g., analyze an entity's (account holder's) liquidity according to their history of cash inflows and outflows, identify discrete revenue streams, etc. and return a report).

The communications network 22 includes, for example and without limitation, one or more of a local area network (LAN), a wide area network (WAN) (e.g., the Internet, etc.), a mobile network, a virtual network, and/or any other suitable private and/or public communications network that facilitates communication among the computing devices 12, 14, the application servers 16, and the machine learning component 28. In addition, the communication network 22 is wired, wireless, or combinations thereof, and includes various components such as modems, gateways, switches, routers, hubs, access points, repeaters, towers, and the like. In some embodiments, the communications network 22 includes more than one type of network, such as a private network provided between the computing device 14, the application servers 16, and the machine learning component 28, and, separately, the public Internet, which facilitates communication between the computing devices 12, the application servers 16, and the machine learning component 28.

In one embodiment, the computing devices 12, 14 and the application servers 16 control access to the machine learning component 28 and the database servers 18 and/or databases 20 under an authentication framework. For example, a user of a computing device 12, 14, may be required to complete an authentication process to access the application servers 16 and/or the machine learning component 28 via the one or more APIs 30. As described above, in some embodiments, one or more of the computing devices 12, 14 may not be internal to the organization, but may be granted access to perform one or more queries via the authentication framework. All or some of the APIs 30 may be maintained and/or owned by the organization and/or may be maintained on the internal network 22 within the scope of the present invention. One of ordinary skill will appreciate that the application servers 16 may be free of, and/or subject to different protocol(s) of, the authentication framework.

In the exemplary embodiment, the application servers 16 and the database servers 18/databases 20 are electronically interfaced in communication via the communication network 24. The communications network 24 also includes, for example and without limitation, one or more of a local area network (LAN), a wide area network (WAN) (e.g., the Internet, etc.), a mobile network, a virtual network, and/or any other suitable private and/or public communications network that facilitates communication among the application servers 16 and the database servers 18/databases 20. In addition, the communication network 24 is wired, wireless, or combinations thereof, and includes various components such as modems, gateways, switches, routers, hubs, access points, repeaters, towers, and the like. In some embodiments, the communications network 24 includes more than one type of network, such as a private network provided between the database servers 18 and the databases 20, and, separately, the public Internet, which facilitates communication between the application servers 16 and the database servers 18.

In the exemplary embodiment, the communication network 24 generally facilitates communication between the application servers 16 and the database servers 18. In addition, the communication network 24 may also generally facilitate communication between the computing devices 12 and/or 14 and the application servers 16, for example in conjunction with the authentication framework discussed above and/or secure transmission protocol(s). The communication network 22 generally facilitates communication between the computing devices 12, 14 and the application servers 16. The communication network 22 may also generally facilitate communication between the application servers 16 and the database servers 18.

In the exemplary embodiment, the computing devices 12, 14 include, for example, workstations, as described below. The computing device 14 is operated by, for example, a developer and/or administrator (not shown). The developer builds applications and/or APIs, such as API 30, at the computing device 14 for deployment, for example, to the computing devices 12 and/or the application servers 16. The applications and/or APIs 30 are used by users at the computing devices 12, for example, to query data and/or generate data predictions, via the machine learning component 28, based on the data stored in and/or retrieved from the databases 20. The administrator defines access rights at the computing device 14 for provisioning user queries to the machine learning component 28 via the applications and/or APIs 30. In an example embodiment, the same individual performs developer and administrator tasks.

In the exemplary embodiment, each of the databases 20 preferably includes a network disk array (a storage area network (SAN)) capable of hosting large volumes of data. Each database 20 also preferably supports high speed disk striping and distributed queries/updates. It is also preferable that support for redundant array of inexpensive disks (RAID) and hot pluggable small computer system interface (SCSI) drives is supported. In one example embodiment, the databases 20 are not integrated with the database servers 18 to avoid, for example, potential performance bottlenecks.

Data persisted or stored in the databases 20 include, for example, raw transaction data 26, such as payment transaction data associated with electronic payments. Raw transaction data 26 includes, for example, a plurality of data objects that includes, for example, an entity's (e.g., a small and medium business (SMB)) transaction data and/or other transaction related data, such as account data, merchant data, customer data, etc., that can be used to develop intelligence information about individual entities, certain types or groups of revenue streams, transactions, business loans, and the like. Each of the data objects including the raw transaction data 26 is associated with one or more data parameters. The data parameters facilitate identifying and categorizing the raw transaction data 26 and include, for example, and without limitation, data type, size, date created, date modified, and the like. Raw transaction data 26 informs users, for example, of the computing devices 12, and facilitates enabling the users to improve operational efficiencies, products and/or services, customer marketing, customer retention, risk reduction, and/or the like. For example, in one embodiment, the application servers 16 are maintained by a payment network. An authenticated employee of a financial organization, such as a commercial bank, accesses, for example, the machine learning component 28 via a data prediction application and/or API 30 implemented on the application servers 16. The machine learning component 28 is configured to generate predictions of an entity's revenue, loan activities, and financial behavior based on the entity's raw transaction data. For example, in an embodiment, the machine learning component 28 obtains an entity's raw transaction data from the databases 20 and uses the data to predict the entity's cash flows (inflow and outflows), various revenue streams, and/or loan activities to inform, for example, the financial organization of the entity's financial health. An employee of the payment network may also access the application servers 16 from a computing device 12 or 14, for example, to query the databases 20, perform maintenance activities, and/or install or update applications, predictions models, and the like.

In an example embodiment, the machine learning component 28 is communicatively coupled with the application servers 16, for example, via the one or more APIs 30. The machine learning component 28 can access the application servers 16 to store and access data and to communicate with the client computing device 12 or 14 through the application servers 16, via the one or more APIs 30 and/or applications. In some embodiments, the machine learning component 28 may be associated with or part of an interchange network, or in communication with a payment network, as described above. In other embodiments, the machine learning component 28 is associated with a third party and is in electronic communication with the payment network.

The machine learning component 28, in the example embodiment, accesses historical payment transaction information or data of financial accounts from the database servers 18 and databases 20. Transaction information or data may include credits, debits, and/or transfers; dates of the various transactions; transaction category information (e.g., ATM withdrawal, electronic deposit, cash deposit, POS transactions, wire transfers, etc.); geographic information (e.g., where the transaction occurred, location of the merchant or the POS device, country, state, city, zip code, longitude, latitude); channel information (e.g., which shopping channel the transaction used, online, in store, etc.); and the like. In some embodiments, the machine learning component 28 may access identity information for the businesses. Such information presents high dimensional sparse features that may be used as inputs of embeddings.

In the example embodiment, the machine learning component 28 uses the transaction information to train and apply machine learning techniques to predict or classify various transaction streams as revenue/non-revenue or loan/non-loan, whether the transaction streams are active or inactive, and/or a cadence of each respective transaction stream. During configuration, the machine learning component 28 performs one or more model training methods to construct (e.g., train) one or more models (not shown in FIG. 1) using a body of training data constructed from aspects of the transaction information or data. Once constructed, the machine learning component 28 uses the model(s) to predict, for selected businesses (e.g., businesses being considered as targets), a business's revenue and/or loan activities. In some embodiments, the models may be exported to scoring, prediction, or recommendation services and integration points. Model servicing services may be integrated into business pipelines, such as embedding model use into offline systems, streaming jobs, or real-time dialogues. For example, the models may be used to identify a set of target businesses to receive various financial offers from a particular category, identify a set of target businesses to receive offers from a particular geography (e.g., zip code, city), and the like. One of ordinary skill will appreciate that embodiments may serve a wide variety of organizations and/or rely on a wide variety of data within the scope of the present invention.

Figure 2:
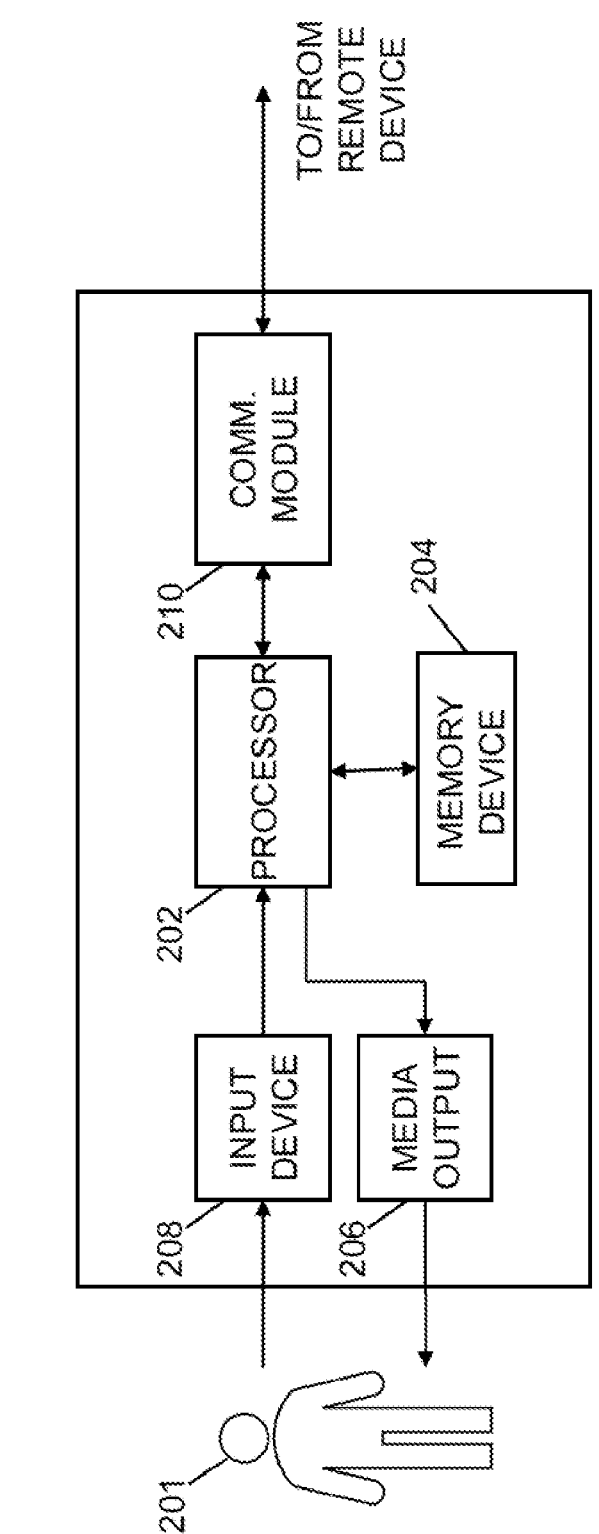
FIG. 2 is an example configuration of a computing system, such as the computing system shown in FIG. 1.

FIG. 2 is an example configuration of a computing system 200 operated by a user 201. In some embodiments, the computing system 200 is a computing device 12 and/or 14 (shown in FIG. 1). In the example embodiment, the computing system 200 includes a processor 202 for executing instructions. In some embodiments, executable instructions are stored in a memory device 204. The processor 202 includes one or more processing units, such as, a multi-core processor configuration. The memory device 204 is any device allowing information such as executable instructions and/or written works to be stored and retrieved. The memory device 204 includes one or more computer readable media.

In one example embodiment, the processor 202 is implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for conducting cryptographic operations. The processor may also be embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the computing system 10 may, in some embodiments, provide a mechanism for automatically updating the software on the computing system 200. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computing system 200 also includes at least one media output component 206 for presenting information to the user 201. The media output component 206 is any component capable of conveying information to the user 201. In some embodiments, the media output component 206 includes an output adapter such as a video adapter and/or an audio adapter. An output adapter is operatively coupled to the processor 202 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 200 includes an input device 208 for receiving input from the user 201. The input device 208 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 206 and the input device 208.

The computing system 200 may also include a communication module 210, which is communicatively connectable to a remote device such as the application servers 16 (shown in FIG. 1) via wires, such as electrical cables or fiber optic cables, or wirelessly, such as radio frequency (RF) communication. The communication module 210 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 204 are, for example, computer readable instructions for providing a user interface to the user 201 via the media output component 206 and, optionally, receiving and processing input from the input device 208. A user interface may include, among other possibilities, a web browser and a client application. Web browsers enable users, such as the user 201, to display and interact with media and other information typically embedded on a web page or a website available from the application servers 16. A client application allows the user 201 to interact with a server application associated, for example, with the application servers 16.

Figure 3:
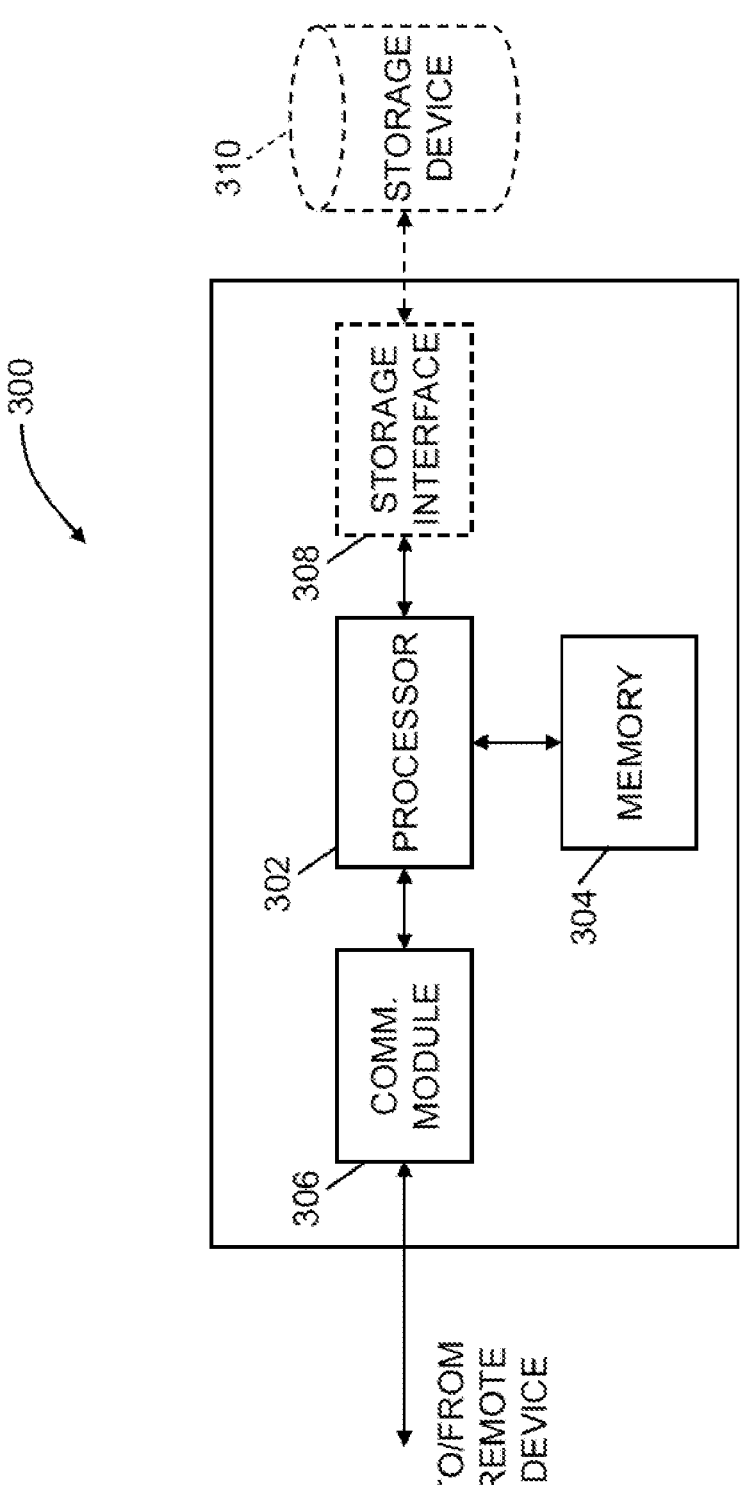
FIG. 3 is an example configuration of a server system, such as the server system shown in FIG. 1.

FIG. 3 is an example configuration of a server system 300. The server system 300 includes, but is not limited to, the application servers 16 (shown in FIG. 1) and the database servers 18 (shown in FIG. 1). In the example embodiment, the server system 300 includes a processor 302 for executing instructions. The instructions may be stored in a memory area 304, for example. The processor 302 includes one or more processing units (e.g., in a multi-core configuration) for executing the instructions. The instructions may be executed within a variety of different operating systems on the server system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.). In the example embodiment, the processor 302 may be implemented as one or more cryptographic processors, as described above with respect to the computing system 200.

The processor 302 is operatively coupled to a communication module 306 such that the server system 300 can communicate with a remote device such as a computing system 200 (shown in FIG. 2) or another server system. For example, the communication module 306 may receive communications from one or more of the computing devices 12 or 14 via the network 22, and/or from one or more of the application servers 16 via the communication network 24, as illustrated in FIG. 1. The communication module 306 is connectable via wires, such as electrical cables or fiber optic cables, or wirelessly, such as radio frequency (RF) communication. The communication module 306 may include, for example, a wired or wireless network adapter or a wireless data transceiver for use with Bluetooth communication, RF communication, near field communication (NFC), and/or with a mobile phone network, Global System for Mobile communications (GSM), 3G, or other mobile data network, and/or Worldwide Interoperability for Microwave Access (WiMax) and the like.

The processor 302 is operatively coupled to the storage device 310. The storage device 310 is any computer-operated hardware suitable for storing and/or retrieving data. In some embodiments, the storage device 310 is integrated in the server system 300, while in other embodiments, the storage device 310 is external to the server system 300. In the exemplary embodiment, the storage device 310 includes, but is not limited to, the database 20 (shown in FIG. 1). For example, the server system 300 may include one or more hard disk drives as the storage device 310. In other embodiments, the storage device 310 is external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 is operatively coupled to the storage device 310 via a storage interface 308. The storage interface 308 is any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory area 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 4:
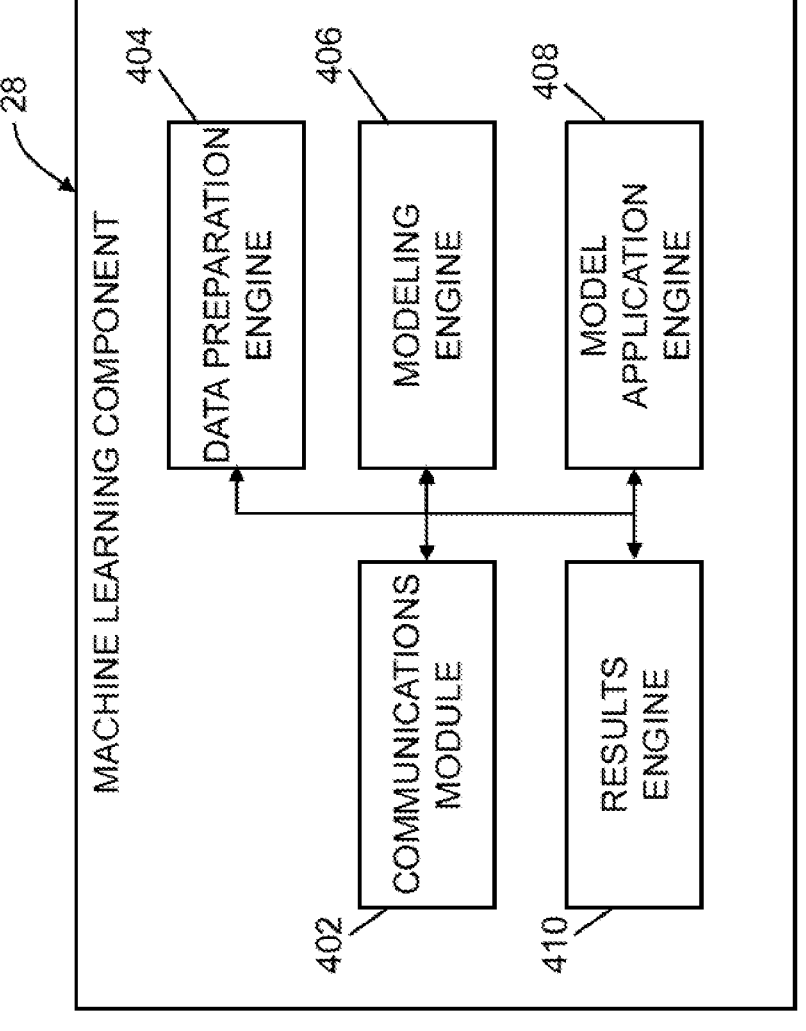
FIG. 4 is a component diagram of a machine learning component, such as the machine learning component shown in FIG. 1.

FIG. 4 is a component diagram of the machine learning component 28, according to one aspect of the present invention. In the example embodiment, the machine learning component 28 includes a communications module 402, a data preparation engine 404, a modeling engine 406, a model application engine 408, and a results engine 410 which, together, perform various aspects of the modeling methods described herein. More specifically, the communications module 402 is configured to perform various communication functionality between the machine learning component 28 and other computing devices, such as the application servers 16, the database servers 18, and/or other computing devices of the computing system 10 (i.e., the payment processing system interchange network). For example, the communications module 402 may be configured to receive input data (e.g., from the application servers 16 and/or the database servers 18) for the various inputs used to create the models described herein, or to transmit results of applications of those models (e.g., to the computing devices 12 and/or the application servers 16).

The data preparation engine 404 is configured to extract selected transaction data from the databases 20, generate one or more tables of prepared data for use in training one or more machine learning models, append various columns and/or identifiers to the prepared data, remove duplicated data, remove outlier data, and/or normalize, transform, or otherwise prepare the data for subsequent use in training the one or more machine learning models. The modeling engine 406 is configured to train the one or more machine learning models, using various input data, which can generate predictions of business revenue and loan activities from raw transaction data. The model application engine 408 applies one or more of the machine learning models built by the modeling engine 406 to raw transaction data to generate predictions of a business's revenue/non-revenue streams, loan/non-loan activities, etc. In an example embodiment, the model application engine 408 is illustrated as a part of the machine learning component 28. In other embodiments, the machine learning models built by the modeling engine 406 may be deployed to or otherwise accessible from other computing devices in the computing system 10, such as the application servers 16. The results engine 410 generates and presents the output or results of the machine learning models to customers (e.g., commercial banks) through various venues.

Exemplary Computer-Implemented Methods for Cash Flow Analytics

Figure 5:
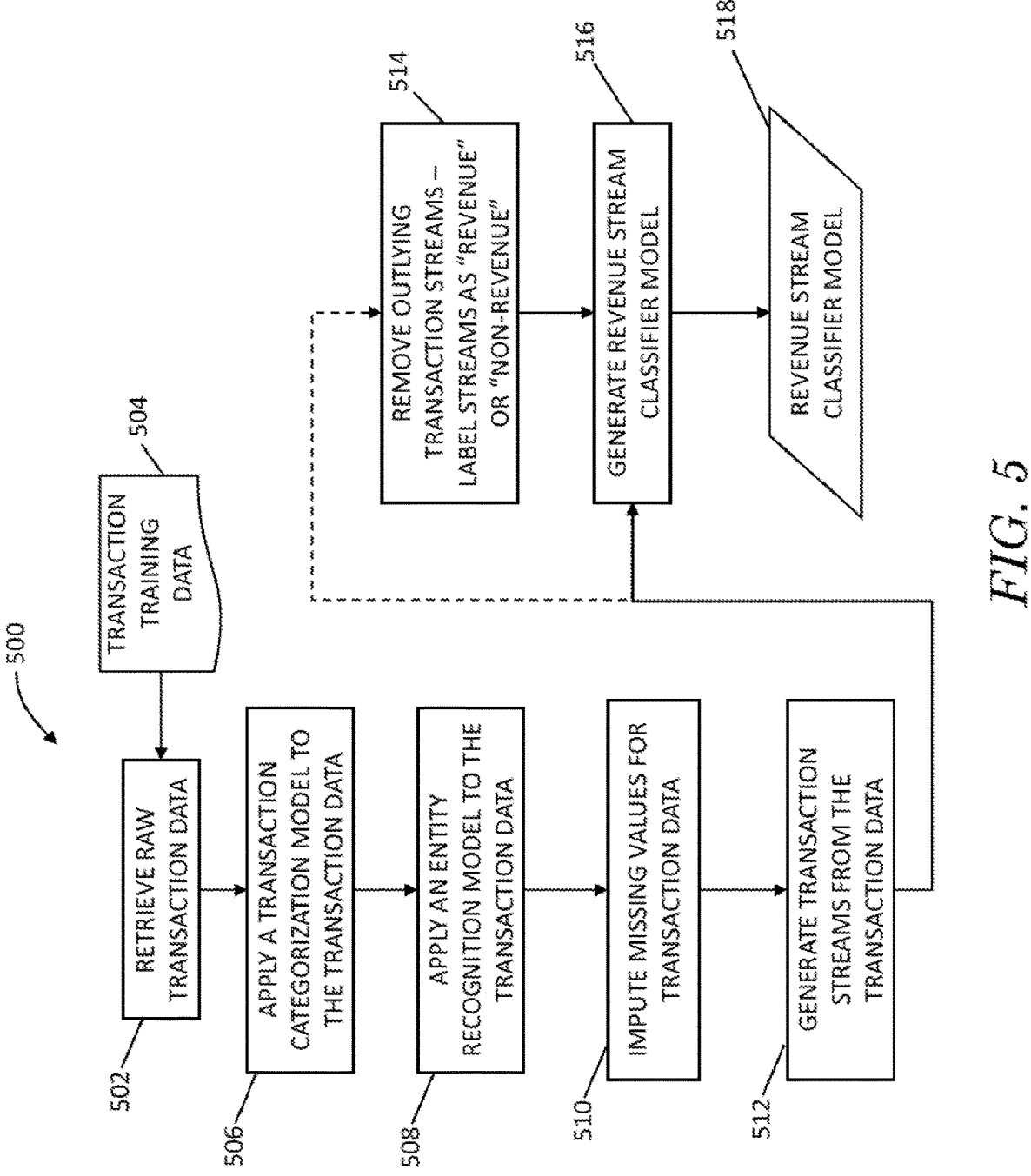
FIG. 5 is a flowchart illustrating an exemplary computer-implemented method for training a revenue stream classifier model to determine revenue of an entity/business based on raw transaction data associated with the entity/business, according to one aspect of the present invention.

FIG. 5 is a flowchart illustrating an exemplary computer-implemented method 500 for training a revenue stream classifier model to determine revenue of an entity/business based on raw transaction data associated with the entity/business, according to one aspect of the present invention. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the machine learning component 28 (shown in FIGS. 1 and 4). In the exemplary embodiment, the computer-implemented method 500 relates to novel techniques to train a revenue stream classifier model for determining revenue for an entity/business from the entity's/business's raw transaction data. While operations within the computer-implemented method 500 are described below regarding the machine learning component 28, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein.

The program(s) stored on the computer-readable medium(s) may instruct the processor or processing units to perform additional, fewer, or alternative actions, including those discussed elsewhere herein.

In the exemplary embodiment, transaction analysis systems, such as the system 10, uses supervised machine learning for purposes of transaction analysis. Such an approach facilitates generating a model trained to specifically predict a known outcome (e.g., a label). Supervised learning is by far the most mature and well-understood area of machine learning, but it requires a large number of labeled training data. Concerning transaction data, however, such labels are not always available. Thus, as described herein, the training data may be partially automatically labelled based on certain data features and partially manually labelled. This data preparation approach proved to be more suitable for the large amount of training data required to generate an accurate classifier model.

At operation 502, the machine learning component 28 (shown in FIGS. 1 and 4) retrieves, via the communications module 402, a set of historical transaction data 504 for model training, such as a selected portion of the raw transaction data 26 (shown in FIG. 1), from one or more databases, such as the databases 20 (shown in FIG. 1). In an example embodiment, the machine learning component 28 pulls a random sample of transaction training data 504 from the databases 20, wherein the transaction training data 504 is associated with a plurality of entities/businesses. In one example, the transaction training data 504 includes a random sample of transaction data from about eighty thousand (80,000) accounts associated with about twenty thousand (20,000) individual entities/businesses. The accounts included direct deposit accounts (DDAs (e.g., checking)), savings accounts, and money market accounts. The transaction training data 504 included about eight hundred and fifty thousand (850,000) discrete transactions spanning a period of about twenty-four (24) months of historical transaction history.

The selected transaction training data 504 may be stored in a data table (not shown) for further manipulation. This operation may be referred to as the initial data load or data extract phase. The databases 20 include databases that are configured to store raw transaction data for transactions that have been cleared and/or declined. In embodiments of the present application, the databases 20 may include, for example, a Global Clearing Management System (GCMS) server, a Global Collection Only (GCO) server, and/or a Mastercard Debit Switch (MDS) server. It can be appreciated by the skilled person in the art that other similar data sources can also be used.

At operation 506, in a first step, the machine learning component 28, via the model application engine 408, applies a transaction categorization model to the transaction training data 504 to infer and/or identify a category for each respective transaction, for example, from various features of each respective transaction. The machine learning component 28, via the data preparation engine 404, labels the respective transaction with the inferred/identified category. For example, and without limitation, each transaction may include one or more data elements or features indicative of a type of transaction, such as an ATM withdrawal, ATM deposit, paycheck deposit, check deposit, wire transfer, mobile transfer, point-of-sale (POS) transaction, etc. It is noted, however, that in some instances, the transaction categorization model may be unable to identify and/or label a category for one or more transactions. A random sample of the transaction training data 504 is manually reviewed by one or more users to determine and/or verify that the transaction categorization model accurately identified the transaction categories and labelled the transaction training data 504 accordingly.

Furthermore, the data preparation engine 404 may label the categorized transactions as either "revenue" or "non-revenue" transactions. For example, the data preparation engine 404 may label POS transactions identified in the transaction training data 504 as "revenue" transactions. Accordingly, each of the transactions are labelled, either manually or automatically, based on some predefined rules, as being either "revenue" or "non-revenue." For the example above, a predefined rule may state that POS transactions are to be automatically labelled as "revenue" transactions. As such, the data preparation engine 404 may automatically label the transaction transactions with a "revenue" label. Further, in some embodiments, the data preparation engine 404 may not be able to determine a proper label for transactions that include bank transfers from a first financial account into a second financial account. There may not be a universal rule for such transactions, and as such, the transactions may be manually labelled as "non-revenue" if it is determined that the transactions are not revenue for the entity or business. In such instances, the data preparation engine 404 then labels each transaction as non-revenue in accordance with the manual label.

At operation 508, in a second step, the machine learning component 28, via the model application engine 408, applies an entity recognition model to the transaction training data 504. More particularly, after application of the categorization model, the transaction training data 504 labelled with a category is analyzed by the entity recognition model. The entity recognition model extracts and/or identifies an entity associated with each respective transaction and labels the respective transaction with the entity. For example, and without limitation, each transaction may include one or more data elements or features indicative of a transacting entity, such as a PayPal transaction, a bank transfer, a peer-to-peer (P2P) service (e.g., Venmo, Zelle, CashApp, etc.), employer, utility company, and the like. It is noted, however, that in some instances, the entity recognition model may be unable to identify and/or label an entity for one or more transactions. A random sample of the transaction training data 504 is manually reviewed by one or more users to determine and/or verify that the entity recognition model accurately identified the transactions' entities and labelled the transaction training data 504 accordingly.

Furthermore, the data preparation engine 404 may label the transactions with entities as either "revenue" or "non-revenue" transactions, based on certain entity characteristics. Further, in some embodiments, the data preparation engine 404 may not be able to determine a proper label for certain transactions. There may not be a universal rule for such transactions, and as such, the transactions may be manually labelled as "revenue" or "non-revenue" if it is determined that the transactions are revenue or not revenue for the identified entity. In such instances, the data preparation engine 404 then labels each transaction in accordance with the manually determined label. Thus, each of the transactions are labelled, either manually or automatically, based on some predefined rules, as being either "revenue" or "non-revenue."

The machine learning component 28, via the data preparation engine 404, then performs a series of data enrichment operations to generate enriched training data, as described below. At operation 510, the data preparation engine 404 performs a data imputation operation to impute one or more missing values for each transaction of the transaction training data 504. More specifically, data preparation engine 404 applies one or more predefined rules to add a category to each transaction that may not have been labelled with a category by the transaction categorization model and/or add an entity to each transaction that may not have been labelled with an entity by the entity recognition model.

At operation 512, the machine learning component 28, via the data preparation engine 404, generates one or more transaction groups or "streams" from the labelled (i.e., category and entity labelled) transaction training data 504. For example, and without limitation, the machine learning component 28 uses the transaction training data 504 output by the entity recognition model and the categorization model, and enriched by the data imputation operation, to group similar transactions (e.g., electronic deposits, check deposits, etc.) or transactions from the same source (e.g., an employer, a utility company, etc.) into one or more transaction streams. In an example embodiment, as discussed above regarding the eight hundred and fifty thousand (850,000) discrete transactions, about three hundred and sixty thousand (360,000) transaction streams were generated from the transaction training data 504.

In some embodiments, at operation 514, the data preparation engine 404 detects and removes one or more outlying transaction streams by applying one or more outlier detection algorithms. For example, and without limitation, transaction streams labeled as outliers may include a pattern in the latest three (3) months of transaction data that changes abruptly as compared to a pattern in the prior nine (9) months. An abrupt change in the pattern may include, for example, a stoppage of revenue, a rapid or unexpected increase in revenue, a rapid or unexpected decrease in revenue, and the like.

Each of the transaction streams are labelled as being either "revenue" or "non-revenue" by the machine learning component 28. The machine learning component 28 applies a "revenue" or "non-revenue" label to each transaction stream according to the transactions' features (properties of the stream, derived from the transactions that constitute the stream) included in the transaction stream. For example, in some embodiments, the data preparation engine 404 may label a transaction stream that includes all POS transactions identified in the transaction training data 504 as a "revenue" stream. In other embodiments, the data preparation engine 404 may label a transaction stream that includes bank transfers from a savings accounting as a "non-revenue" stream.

At operation 516, the machine learning component 28, via the modeling engine 406, receives as input the transaction training data 504 grouped into data streams labelled as either revenue or non-revenue for use as training data to train a neural network to generate a revenue stream classifier model 518. The revenue stream classifier model is a supervised machine learning model used to provide a "confidence score" for each transaction stream later processed by the model 518. The confidence score provides an indication of how likely a processed transaction stream is revenue, as opposed to non-revenue, for an entity/business. As used herein, the term "revenue" includes payments to the entity as opposed to financial benefits or refunds, which are considered non-revenue. For example, a stream of payroll deposits (financial benefits) made into a checking or savings account is considered non-revenue. A series of check/cash deposits, however, through a variety of ways such as depositing at a bank, through a ATM machine, or via mobile app may be considered revenue.

In a specific example of a neural network, the neural network may be constructed of an input layer and an output layer, with a number of 'hidden' layers therebetween. Each of these layers may include a number of distinct nodes. The nodes of the input layer are each connected to the nodes of the first hidden layer. The nodes of the first hidden layer are then connected to the nodes of the following hidden layer or, in the event that there are no further hidden layers, the output layer. However, while, in this specific example, the nodes of the input layer are described as each being connected to the nodes of the first hidden layer, it will be appreciated that the present disclosure is not particularly limited in this regard. Indeed, other types of neural networks may be used in accordance with embodiments of the disclosure as desired depending on the situation to which embodiments of the disclosure are applied.

The nodes of the neural network each take a number of inputs and produce an output based on those inputs. The inputs of each node have individual weights applied to them. The inputs (such as the properties of the accounts) are then processed by the hidden layers using weights, which are adjusted during training. The output layer produces a prediction from the neural network (which varies depending on the input that was provided).

In examples, during training, adjustment of the weights of the nodes of the neural network is achieved through linear regression models. However, in other examples, logistic regression can be used during training. Basically, training of the neural network is achieved by adjusting the weights of the nodes of the neural network to identify the weighting factors that, for the training input data provided, produce the best match to the actual data which has been provided.

In other words, during training, both the inputs and target outputs of the neural network may be provided to the model to be trained. The model then processes the inputs and compares the resulting output against the target data (i.e., sets of labelled historical transaction data from one or more financial account issuers). Differences between the output and the target data are then propagated back through the neural network, causing the neural network to adjust the weights of the respective nodes of the neural network. However, in other examples, training can be achieved without the outputs, using constraints of the system during the optimization process.

Once trained, new input data (i.e., new transaction data associated with an entity) can then be provided to the input layer of the trained revenue stream classifier model, which will cause the trained revenue stream classifier model to generate (on the basis of the weights applied to each of the nodes of the neural network during training) a predicted output for the given input data (e.g., being a prediction of which transaction streams and/or transactions are revenue and which are non-revenue).

However, it will be appreciated that the neural network described here is not particularly limiting to the present disclosure. It is contemplated that certain aspects of the present invention may utilize any type of machine learning model or machine learning algorithm.

Figure 6:
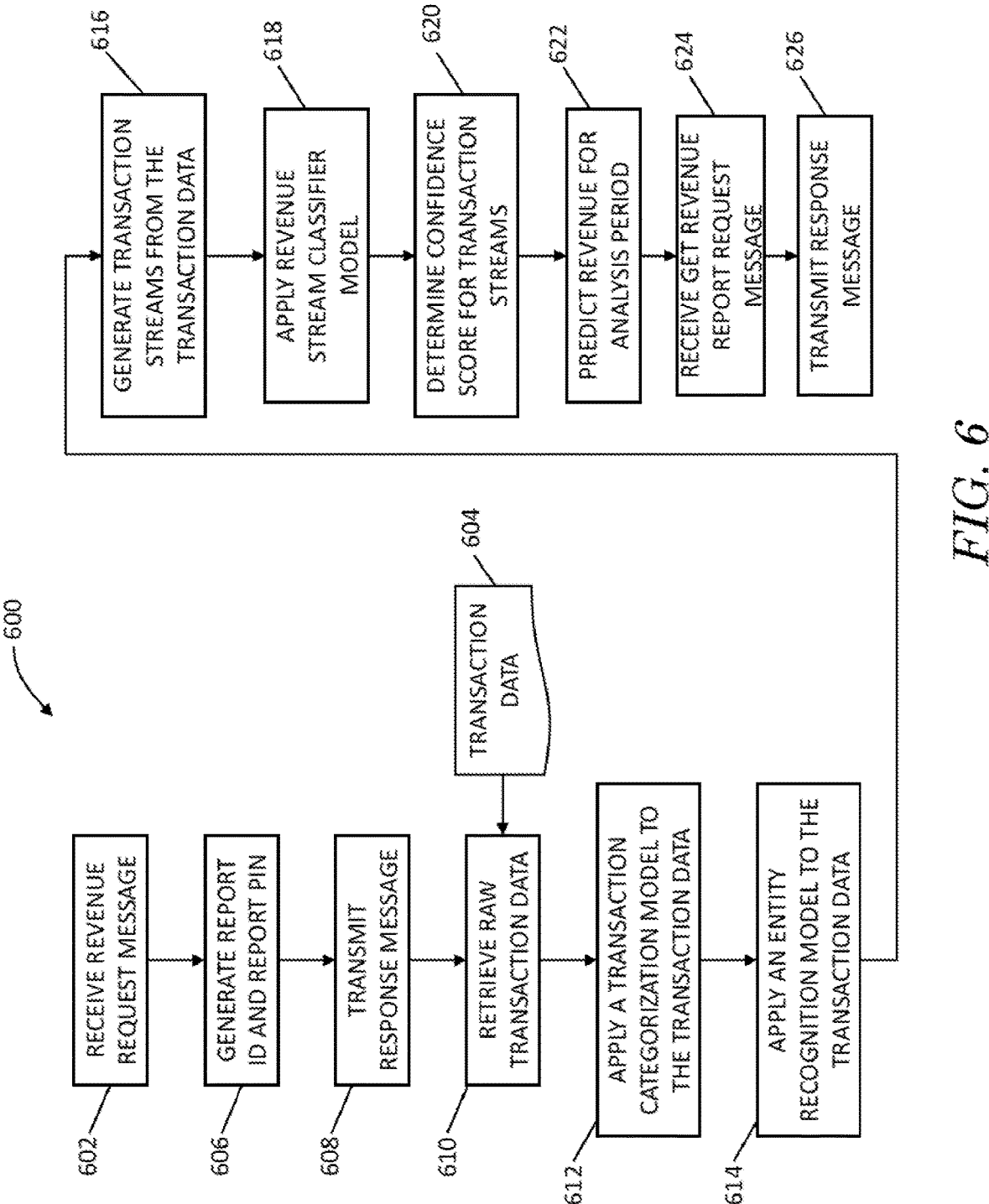
FIG. 6 is a flowchart illustrating an exemplary computer-implemented method for determining revenue of an entity/business based on raw transaction data associated with the entity/business, according to one aspect of the present invention.

FIG. 6 is a flowchart illustrating an exemplary computer-implemented method 600 for determining revenue of an entity/business based on raw transaction data associated with the entity/business, according to one aspect of the present invention. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-4. In one embodiment, the computer-implemented method 600 is implemented by the machine learning component 28 (shown in FIGS. 1 and 4). In the exemplary embodiment, the computer-implemented method 600 relates to novel techniques to predict a revenue stream for a business from its raw transaction data. While operations within the computer-implemented method 600 are described below regarding the machine learning component 28, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 602, the machine learning component 28 receives, via the communications module 402, a revenue request message from a client computing device, such as a computing device 12 (shown in FIG. 1). More particularly, the revenue request message includes a "Request Cash Flow Analytics" API call to the machine learning component 28. The API call (i.e., the revenue request message) includes, for example, a target entity identifier that is associated with a target entity, an optional account list of financial accounts associated with the target entity, and an optional selected period of transaction data (e.g., three (3) months, six (6) months, one (1) year, etc.), as depicted in Table 1 below.

TABLE 1

| Path Variables | | | |
| --- | --- | --- | --- |
| Variable | Type | Definition | Required |
| customerId | Long | Entity Identifier (ID) | Yes |
| Body | | | |
| Key | Type | Description | Required |
| accountIds | Array <Long> | List of account IDs of the entity | No - if not present, ALL accounts for the target entity are analyzed |
| lengthOfReport | Int | Length of report in days (30, 90, 180, 270, 365, 730, etc.) | No - default is 730 days if not provided |

In response to the revenue request message (if the request is accepted as valid), at operation 606, the machine learning component 28 creates a report identifier (ID) and report PIN, which will be required to access any generated cash flow analytics of the entity based on the revenue request message.

The report ID and report PIN may be stored, for example, in memory (e.g., the memory 304, the database 20, etc.) for later access or lookup. At operation 608, the machine learning component 28 transmits a response message (e.g., response code 200 described below) to the client computing device 12. The response message includes, for example, the report ID and report PIN. In some embodiments, the machine learning component 28 may return additional data elements in the response message, as depicted below in Table 2.

TABLE 2

| Response (code 200 OK) | | |
| --- | --- | --- |
| Key | Type | Description |
| reportId | String | The ID of the analytics generated by the request. This will be used to get the analytics |
| reportPin | String | PIN used to access the generated report |
| customerId | Long | Entity ID |
| accountIds | List [Long] | List of account IDs of the entity included in the report (either the account IDs provided in the request, or all accounts associated with the entity if omitted) |
| createdDate | String | The ISO 8601 time that the analytics operation began |
| title | String | Fixed - for example "Cashflow Analytics" |
| businessId | Long | Business ID associated with the entity that the report was requested for |
| requesterName | String | Name of client requesting the report |

In certain embodiments, the machine learning component 28 may return various response codes, other than response code 200 discussed above. The various response codes (other than response code 200) are generally indicative of a failure to accept/authorize the revenue request message and/or generate the requested analytics report. Table 3, below, depicts the various responses codes that may be returned by the machine learning component 28, in accordance with an aspect of the invention.

TABLE 3

| Response Codes | | |
| --- | --- | --- |
| Code | Response | Description |
| 200 | OK | The Analytics request has been accepted and the results have been generated |
| 400 | Bad Request | Request was not formed correctly |
| 401 | Unauthorized Error | Authentication failed |
| 403 | Forbidden | The requesting client does not have access to the given CustomerID, or one or more of the AccountIDs given does not belong to the CustomerID given |
| 404 | Not Found | The requested resource could not be found but may be available in the future |

TABLE 3-continued

Response Codes

| Code | Response | Description |
|------|----------|-------------|
| 408 | Time out | Request timed out waiting for entity transaction data to be aggregated/retrieved. Subsequent requests may succeed once aggregation has completed |
| 409 | Conflict | Pre-conditions for request not met (e.g., FCRA compliance rules) |
| 503 | Service Unavailable | Service currently unavailable. The service may be available with later requests |

At operation 610, the machine learning component 28 retrieves, via the communications module 402, selected historical raw transaction data 604, such as a selected portion of the raw transaction data 26 (shown in FIG. 1), from one or more databases, such as the databases 20 (shown in FIG. 1). In an example embodiment, the machine learning component 28 pulls relevant raw transaction data 604 from the databases 20, wherein the relevant raw transaction data 604 is associated with the target entity identifier received in the revenue request message. Furthermore, in certain embodiments, the machine learning component 28 retrieves relevant raw transaction data 604 from only those accounts identified in the revenue request message and for the period specified in the revenue request message. As noted above, if the revenue request message does not include a list of accounts and/or a specified period, the machine learning component 28 retrieves relevant raw transaction data 604 from all permissioned financial accounts associated with the target entity identifier for a default period of seven hundred and thirty (730) days. The selected raw transaction data 604 may be temporarily saved in a data table (not shown) for further manipulation. This operation may be referred to as the initial data load or data extract phase.

At operation 612, the machine learning component 28, via the model application engine 408, in a first instance applies a transaction categorization model to the selected raw transaction data 604 to infer and/or identify a category for each respective transaction, for example, from various features of each respective transaction. The machine learning component 28, via the data preparation engine 404, labels the respective transaction with the inferred/identified category. For example, and without limitation, each transaction may include one or more data elements or features indicative of a type of transaction, such as an ATM withdrawal, ATM deposit, paycheck deposit, check deposit, wire transfer, mobile transfer, point-of-sale (POS) transaction, etc.

At operation 614, the machine learning component 28, via the model application engine 408, in a second instance applies an entity recognition model to the selected raw transaction data 604. More particularly, after application of the categorization model, the category labeled transaction data 604 is analyzed by the entity recognition model. The entity recognition model extracts and/or identifies an entity associated with each respective transaction and labels the respective transaction with the entity. For example, and without limitation, each transaction may include one or more data elements or features indicative of a transacting entity, such as a PayPal transaction, a bank transfer, a peer-to-peer (P2P) service (e.g., Venmo, Zelle, CashApp, etc.), employer, utility company, and the like.

At operation 616, the machine learning component 28, via the data preparation engine 404, generates one or more transaction groups or "streams" from the labelled (i.e., category and entity) raw transaction data 604. For example, and without limitation, the machine learning component 28 uses the transaction data 604 output by the entity recognition model and the categorization model to group similar transactions (e.g., electronic deposits, check deposits, etc.) or transactions from the same source (e.g., an employer, a utility company, etc.) into one or more transaction streams. The machine learning component 28 also uses the categories from the categorization model to create engineered features and improve accuracy of the output.

At operation 618, the machine learning component 28, via the model application engine 408, applies the revenue stream classifier model 518 to each transaction stream of the one or more transaction streams generated in operation 616. The revenue stream classifier model 518 is trained on labelled transaction data using a supervised training technique, as discussed in more detail above. The revenue stream classifier model (such as a neural network algorithm) may be configured to use training examples provided in transaction training data during the training phase in order to learn how to predict which transactions and/or transaction streams are revenue for an entity.

At operation 620, the machine learning component 28, via the results engine 410, determines a confidence score for each transaction stream analyzed by the revenue stream classifier model 518. More particularly, in the example embodiment, the results engine 410 may determine a confidence score for each respective transaction stream that is in a range between and including zero (0) and one hundred (100). A transaction stream with a confidence score above a selected threshold, such as fifty (50), may be classified as revenue for the entity. It is noted that the confidence score range described above is only an example and that the confidence score range may be any desired range.

Optionally, the machine learning component 28, via the results engine 410, determines one or more of a cadence of each respective transaction stream, a status of each respective transaction stream, and/or transaction identifiers (IDs) for each respective transaction associated with each respective transaction stream. In the example embodiment, the cadence of a respective transaction stream includes a chronological rhythm identified or determined for the transactions that define the respective transaction stream. For example, a transaction stream that includes an entity's paycheck deposits may have a cadence of fourteen (14) days, as in some instances a paycheck is received bi-weekly. The status of a transaction stream includes whether the particular transaction stream is "active" or "inactive." An "active" stream, as used herein, refers to a transaction stream in which the most recent deposit transaction in the transaction stream occurred as expected regarding the transaction stream's cadence and the next expected transaction date is in the future. If the above constraint is not met, the transaction stream is identified as being inactive. The transaction IDs of a transaction stream include a list of all the transaction IDs associated with all the transactions that define the respective transaction stream.

At operation 622, the machine learning component 28 predicts, via the results engine 410, a total revenue amount for the transaction analysis period (i.e., the optional selected period of transaction data or the default period) using the transaction streams determined to be "revenue." More particularly, for each respective transaction stream determined to be "revenue," the machine learning component 28 totals or aggregates the deposit amounts of the transactions that define the respective transaction stream. The machine learning component 28 then totals or aggregates the totals of all the "revenue" transaction streams to determine a total revenue amount for the transaction analysis period.

At operation 624, the machine learning component 28 receives, via the communications module 402, a get revenue report request message from the client computing device, such as a computing device 12. More particularly, the get revenue report request message includes a "Get Cash Flow Analytics" API call to the machine learning component 28. The API call (i.e., the get revenue report request message) includes, for example, the report ID received in response to the revenue request message transmitted in operation 602, as depicted in Table 4 below.

TABLE 4

| Path Variables | | | |
|---|---|---|---|
| Variable | Type | Definition | Required |
| reportId | String | Analytics id returned when Generate Cash Flow Analytics endpoint was called | Yes |

| Query Parameters | | | |
|---|---|---|---|
| Parameter | Type | Description | Required |
| purpose | String | Permissible purpose code | Yes |

In response to the get revenue report request message (if the request is successful), at operation 626, the machine learning component 28 transmits a report response message (e.g., report response code 200 described below) to the client computing device 12. The report response message includes, for example, the generated cash flow analytics report of the target entity, including the predicted total revenue for the transaction analysis period and/or by month for the transaction analysis period, which may be included as part of the accountResults object in the table below. More particularly, the machine learning component 28 returns the report response message including a plurality of data objects enclosed therein, as depicted below in Table 5 below.

TABLE 5

| Response (code 200 Success) | | |
|---|---|---|
| Key | Type | Description |
| reportId | String | The ID of the analytics generated by the request |
| customerId | Long | ID for the entity |
| title | String | Fixed - For example, "Cash Flow Analytics" |
| reportHeader | ReportHeader | Report metadata including business details, report ID, etc. |
| businessId | Long | ID for the Business |
| requesterName | String | Name of client who requested the analytics |
| businessSummary | BusinessSummary | Cash flow analytics metrics summarized/aggregated across all accounts included in the report |

TABLE 5-continued

| Response (code 200 Success) | | |
|---|---|---|
| Key | Type | Description |
| accountResults | List [AccountResults] | Cash flow analytics metrics for each individual account in the report |
| totalRevenue | Float | Sum of all transactions across all the accounts |

In certain embodiments, the machine learning component 28 may return various response codes, other than report response code 200 discussed above. The various report response codes (other than report response code 200) are generally indicative of a failure to accept/authorize the revenue request message and/or generate the requested analytics report. Table 6, below, depicts the various responses codes that may be returned by the machine learning component 28, in accordance with an aspect of the invention.

TABLE 6

| Response Codes | | |
|---|---|---|
| Code | Response | Description |
| 200 | OK | OK, retrieved the analytics results |
| 400 | Bad Request | Request was not formed correctly |
| 401 | Unauthorized Error | Authentication failed |
| 403 | Forbidden | The requesting client does not have access to the given analyticsID |
| 404 | Not Found | The requested resource could not be found but may be available in the future |
| 409 | Conflict | The request was valid but could not be completed due to some failed prerequisite condition |

It is noted that the machine learning component 28 may determine a plurality of numerical metrics for the entity based on the determination of the entity's "revenue" transaction streams. For example, and without limitation, the accountResults object may contain one or more of the following numerical metrics:

transaction analytics (e.g., average transaction value for the report time period, activity withdrawals/debits for the report time period, activity deposits/credits for the report time period, last transaction date, and historic count of weeks with zero transactions out of the total weeks from the start);

inflows (e.g., maximum deposit by month for the report time period, minimum deposit by month for the report time period, total deposits by month for the report time period, count of total deposits by month for the report time period, historic sum of deposits from start, historic count of total deposits from start, and average deposit by report time period);

outflows (e.g., minimum withdrawal by month for the report time period, maximum withdrawal by month for the report time period, total withdrawals by month for the report time period, count of total withdrawals by month for the report time period, historic sum of withdrawals from the start, historic count of withdrawal transactions from the start, and average withdrawal for report time period);

negative triggers (e.g., insufficient fund fees for the report time period, such as non-sufficient funds, negative balance fees, overdraft fee, courtesy pay, excessive transaction fees, unavailable fund fees, and returned check charges).

Exemplary Computer-Implemented Methods for Determining Credit Stacking

Figure 7:
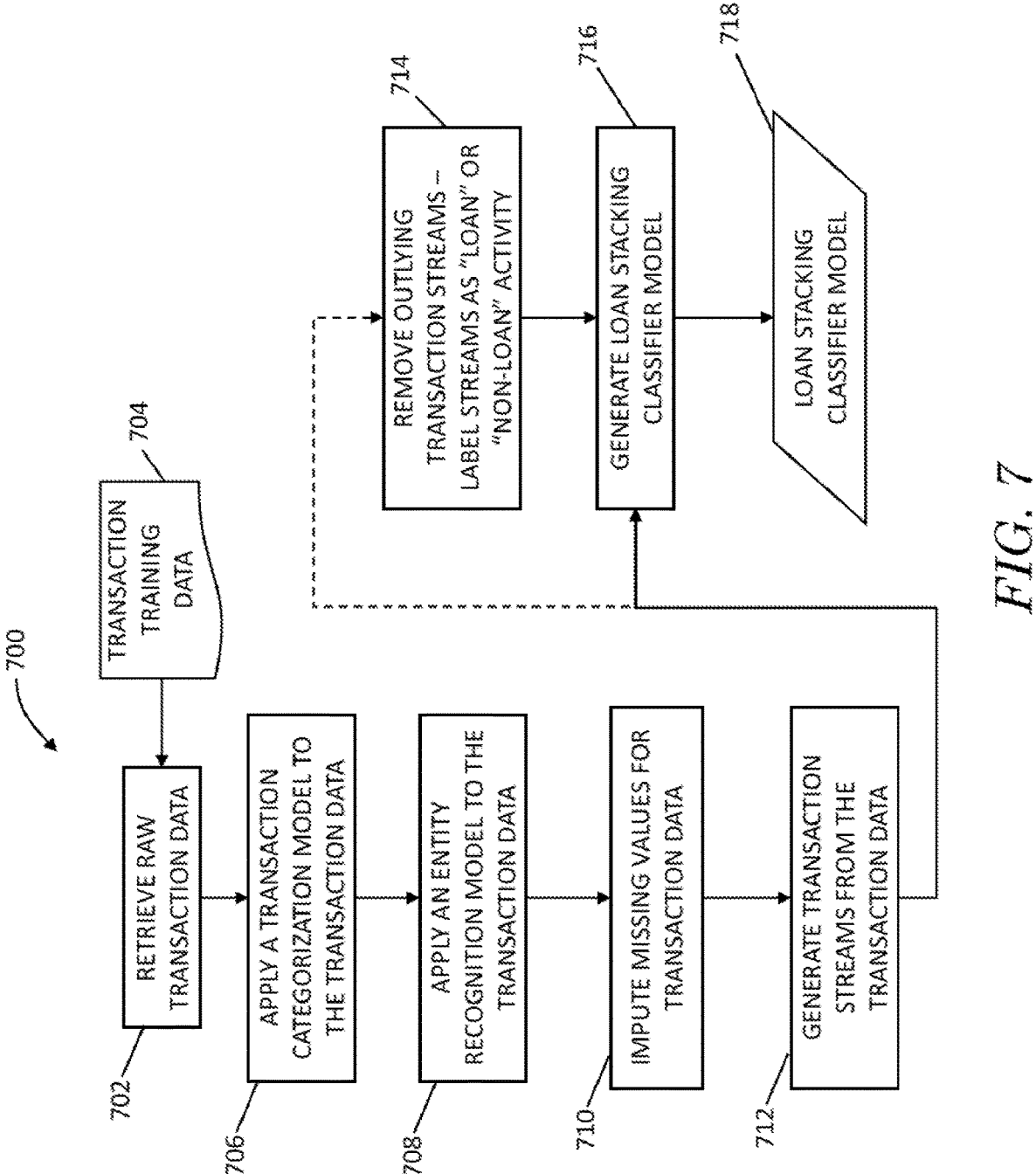
FIG. 7 is a flowchart illustrating an exemplary computer-implemented method for training a credit stacking classifier model to determine loan activity of an entity/business based on raw transaction data associated with the entity/business, according to one aspect of the present invention.

FIG. 7 is a flowchart illustrating an exemplary computer-implemented method 700 for training a credit stacking classifier model to determine loan activity of an entity/business based on raw transaction data associated with the entity/business, according to one aspect of the present invention. The operations described herein may be performed in the order shown in FIG. 7 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 700 is described below, for ease of reference, as being executed by exemplary devices and components introduced with the embodiments illustrated in FIGS. 1-4. In one embodiment, the computer-implemented method 700 is implemented by the machine learning component 28 (shown in FIGS. 1 and 4). In the exemplary embodiment, the computer-implemented method 700 relates to novel techniques to train a credit stacking classifier model for determining revenue for an entity/business from the entity's/business's raw transaction data. While operations within the computer-implemented method 700 are described below regarding the machine learning component 28, according to some aspects of the present invention, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, the machine learning component 28 (shown in FIGS. 1 and 4) retrieves, via the communications module 402, a set of historical transaction data 704 for model training, such as a selected portion of the raw transaction data 26 (shown in FIG. 1), from one or more databases, such as the databases 20 (shown in FIG. 1). In an example embodiment, the machine learning component 28 pulls a random sample of transaction training data 704 from the databases 20, wherein the transaction training data 704 is associated with a plurality of entities/businesses. For example, in one example, the transaction training data 704 includes a random sample of transaction data from about eighty thousand (80,000) accounts associated with about twenty thousand (20,000) individual entities/businesses. The accounts included direct deposit accounts (DDAs (e.g., checking)), savings accounts, and money market accounts. The transaction training data 704 included about eight hundred and fifty thousand (850,000) discrete transactions spanning a period of about twenty-four (24) months of historical transaction history.

The selected transaction training data 704 may be stored in a data table (not shown) for further manipulation. This operation may be referred to as the initial data load or data extract phase. The databases 20 include databases that are configured to store raw transaction data for transactions that have been cleared and/or declined. In embodiments of the present application, the databases 20 may include, for example, a Global Clearing Management System (GCMS) server, a Global Collection Only (GCO) server, and/or a Mastercard Debit Switch (MDS) server. It can be appreciated by the skilled person in the art that other similar data sources can also be used.

At operation 706, in a first step, the machine learning component 28, via the model application engine 408, applies a transaction categorization model to the transaction training data 704 to infer and/or identify a category for each respective transaction, for example, from various features of each respective transaction. The machine learning component 28, via the data preparation engine 404, labels the respective transaction with the inferred/identified category. For example, and without limitation, each transaction may include one or more data elements or features indicative of a type of transaction, such as an ATM withdrawal, ATM deposit, paycheck deposit, check deposit, wire transfer, mobile transfer, point-of-sale (POS) transaction, etc. It is noted, however, that in some instances, the transaction categorization model may be unable to identify and/or label a category for one or more transactions. A random sample of the transaction training data 704 is manually reviewed by one or more users to determine and/or verify that the transaction categorization model accurately identified the transaction categories and labelled the transaction training data 704 accordingly.

Furthermore, the data preparation engine 404 may label the categorized transactions as either "loan" or "non-loan" activity transactions. For example, the data preparation engine 404 may label self-identified loan transactions identified in the transaction training data 504 as "loan" activity transactions. Accordingly, each of the transactions are labelled, either manually or automatically, based on some predefined rules, as being either "loan" or "non-loan." For the example above, a predefined rule may state that self-identified loan transactions are to be automatically labelled as "loan" transactions. As such, the data preparation engine 404 may automatically label the self-identified loan transactions with a "loan" activity label. Further, in some embodiments, the data preparation engine 404 may not be able to determine a proper label for transactions that include bank transfers from a first financial account into a second financial account. There may not be a universal rule for such transactions, and as such, the transactions may be manually labelled as "non-loan" if it is determined that the transactions are not indicative of loan activity for the entity or business. In such instances, the data preparation engine 404 then labels each transaction as non-loan activity in accordance with the manual label.

At operation 708, in a second step, the machine learning component 28, via the model application engine 408, applies an entity recognition model to the transaction training data 704. More particularly, after application of the categorization model, the transaction training data 704 labelled with a category is analyzed by the entity recognition model. The entity recognition model extracts and/or identifies an entity associated with each respective transaction and labels the respective transaction with the entity. For example, and without limitation, each transaction may include one or more data elements or features indicative of a transacting entity, such as a PayPal transaction, a bank transfer, a peer-to-peer (P2P) service (e.g., Venmo, Zelle, CashApp, etc.), employer, utility company, and the like. It is noted, however, that in some instances, the entity recognition model may be unable to identify and/or label an entity for one or more transactions. A random sample of the transaction training data 704 is manually reviewed by one or more users to determine and/or verify that the entity recognition model accurately identified the transaction entities and labelled the transaction training data 704 accordingly.

Furthermore, the data preparation engine 404 may label the transactions with entities as either "loan" or "non-loan" activity transactions, based on certain entity characteristics. Further, in some embodiments, the data preparation engine 404 may not be able to determine a proper label for certain transactions. There may not be a universal rule for such transactions, and as such, the transactions may be manually labelled as "loan" or "non-loan" activity if it is determined that the transactions are loan or non-loan activity for the identified entity. In such instances, the data preparation engine 404 then labels each transaction in accordance with the manually determined label. Thus, each of the transactions are labelled, either manually or automatically, based on some predefined rules, as being either "loan" or "non-loan" activity.

The machine learning component 28, via the data preparation engine 404, then performs a series of data enrichment operations to generate enriched training data, as described below. At operation 710, the data preparation engine 404 performs a data imputation operation to impute one or more missing values for each transaction of the transaction training data 704. More specifically, data preparation engine 404 applies one or more predefined rules to add a category to each transaction that may not have been labelled with a category by the transaction categorization model and/or add an entity to each transaction that may not have been labelled with an entity by the entity recognition model.

At operation 712, the machine learning component 28, via the data preparation engine 404, generates one or more transaction groups or "streams" from the labelled (i.e., category and entity labelled) transaction training data 704. For example, and without limitation, the machine learning component 28 uses the transaction training data 704 output by the entity recognition model and the categorization model, and enriched by the data imputation operation, to group similar transactions (e.g., electronic deposits, check deposits, etc.) or transactions from the same source (e.g., an employer, a utility company, etc.) into one or more transaction streams. In an example embodiment, as discussed above regarding the eight hundred and fifty thousand (850,000) discrete transactions, about three hundred and sixty thousand (360,000) transaction streams were generated from the transaction training data 704. In some embodiments, at operation 714, the data preparation engine 404 identifies and removes one or more outlying transaction streams by applying one or more outlier detection algorithms.

Each of the transaction streams are labelled as being either "loan" or "non-loan" activity by the machine learning component 28. The machine learning component 28 applies a "loan" or "non-loan" label to each transaction stream according to the transactions' labels included in the transaction stream. For example, in some embodiments, the data preparation engine 404 may label a transaction stream that includes all self-identifying loan transactions identified in the transaction training data 504 as a "loan" stream. In other embodiments, the data preparation engine 404 may label a transaction stream that includes bank transfers from a savings accounting as a "non-loan" stream.

At operation 716, the machine learning component 28, via the modeling engine 406, receives as input the transaction training data 704 grouped into data streams labelled as either "loan" or "non-loan" for use as training data to train a neural network to generate a credit stacking classifier model 718. The credit stacking classifier model 718 is a supervised machine learning model used to provide a "confidence score" for each transaction stream processed by the model 718. The confidence score provides an indication of how likely a processed transaction stream is associated with loan activity, as opposed to non-loan activity, for an entity/business.

Figure 8:
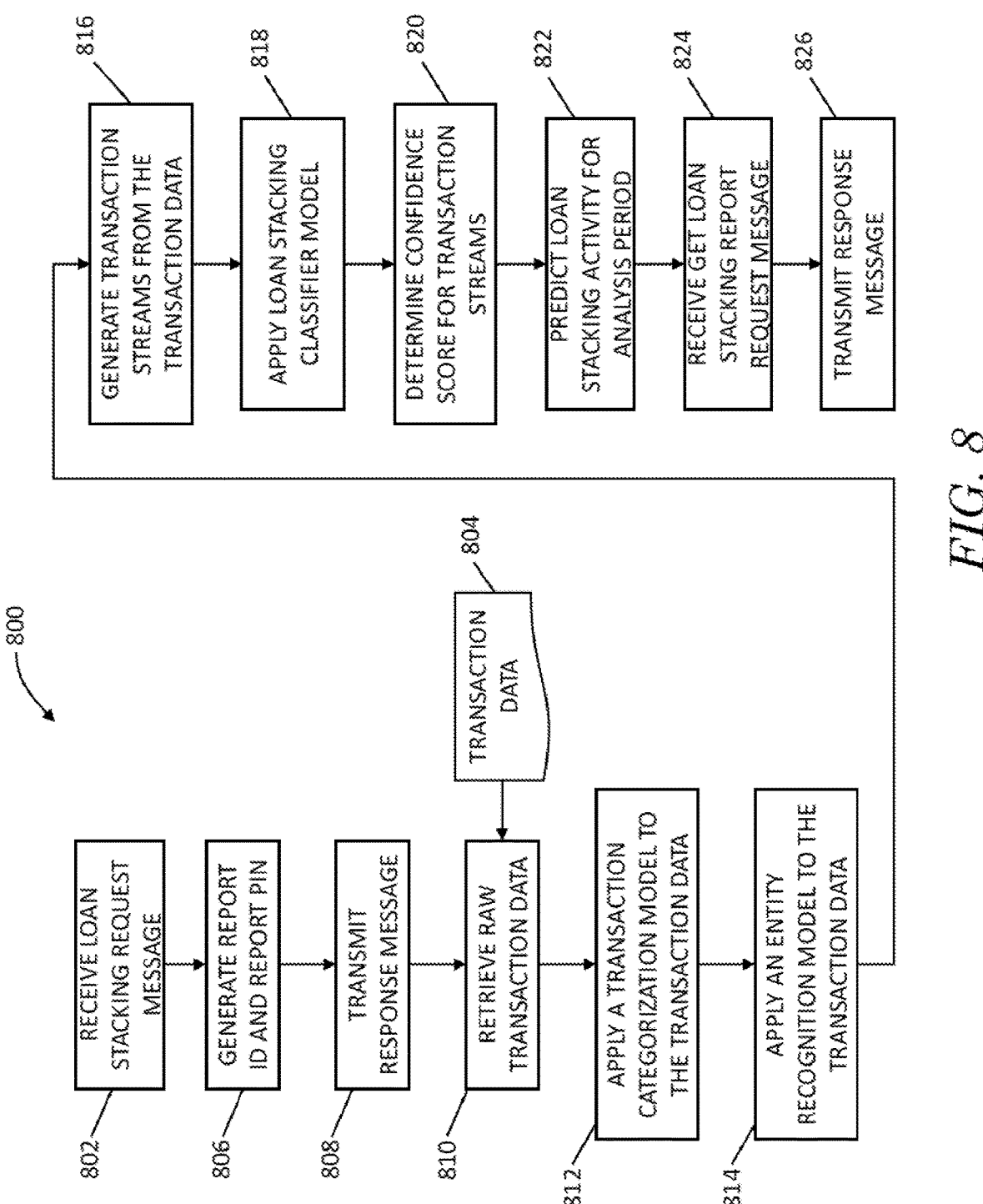
FIG. 8 is a flowchart illustrating an exemplary computer-implemented method for determining credit stacking activity of an entity/business based on raw transaction data associated with the entity/business, according to one aspect of the present invention.

FIG. 8 is a flowchart illustrating an exemplary computer-implemented method 800 for determining credit/loan stacking activity of an entity/business based on raw transaction data associated with the entity/business, according to one aspect of the present invention. The operations described herein may be performed in the order shown in FIG. 8 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 800 is described below, for ease of reference, as being executed by exemplary devices and components introduced with the embodiments illustrated in FIGS. 1-4. In one embodiment, the computer-implemented method 800 is implemented by the machine learning component 28 (shown in FIGS. 1 and 4). In the exemplary embodiment, the computer-implemented method 800 relates to novel techniques to predict credit/loan stacking activities for an entity/business from its raw transaction data. "Credit/loan stacking." as used herein, includes a series of account deposits that qualify as loans (or new lines of credit) within a two (2) week period and/or, if a second credit/loan receipt transaction is identified after a two (2) week period following a first credit/loan receipt, evaluating a debt-to-income ratio (DTI) of the entity/business and determining that the DTI is greater than or equal to a predefined threshold, such as fifty percent (50%). For clarity, "loan stacking" will be referenced further herein. It is noted, however, that loan stacking includes both loan and credit stacking, as defined above. While operations within the computer-implemented method 800 are described below regarding the machine learning component 28, according to some aspects of the present invention, the computer-implemented method 800 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s)

may instruct the processor or processing units to perform additional, fewer, or alternative actions, including those discussed elsewhere herein.

At operation 802, the machine learning component 28 receives, via the communications module 402, a loan stacking request message from a client computing device, such as a computing device 12 (shown in FIG. 1). More particularly, the loan stacking message includes a "Request Loan Stacking Analytics" API call to the machine learning component 28. The API call (i.e., the loan stacking request message) includes, for example, a target entity identifier that is associated with a target entity, an optional account list of financial accounts associated with the target entity, and an optional selected period of transaction data (e.g., three (3) months, six (6) months, one (1) year, etc.), as depicted in Table 7 below.

TABLE 7

| Path Variables | | | |
| --- | --- | --- | --- |
| Variable | Type | Definition | Required |
| customerId | Long | Entity Identifier (ID) | Yes |

| Body | | | |
| --- | --- | --- | --- |
| Key | Type | Description | Required |
| accountIds | Array <Long> | List of account IDs of the entity | No - if not present, ALL accounts for the target entity are analyzed |
| lengthOfReport | Int | Length of report in days (30, 90, 180, 270, 365, 730, etc.) | No - default is 730 days if not provided |

In response to the loan stacking request message (if the request is accepted as valid), at operation 806, the machine learning component 28 creates a report ID and report PIN, which will be required to access any generated loan stacking analytics report of the entity based on the loan stacking request message. The report ID and report PIN may be stored, for example, in memory (e.g., the memory 304, the database 20, etc.) for later access or lookup. At operation 808, the machine learning component 28 transmits a response message (e.g., response code 200 described below) to the client computing device 12. The response message includes, for example, the report ID and report PIN. In some embodiments, the machine learning component 28 may return additional data elements in the response message, as depicted below in Table 8.

TABLE 8

| Response (code 200 OK) | | |
| --- | --- | --- |
| Key | Type | Description |
| reportId | String | The ID of the analytics generated by the request. This will be used to get the analytics |
| reportPin | String | PIN used to access the generated report |
| customerId | Long | Entity ID |
| accountIds | List [Long] | List of account IDs of the entity included in the report (either the account IDs provided in the request, or all accounts associated with the entity if omitted) |

TABLE 8-continued

| Response (code 200 OK) | | |
| --- | --- | --- |
| Key | Type | Description |
| createdDate | String | The ISO 8601 time that the analytics operation began |
| title | String | Fixed - for example "Cashflow Analytics" |
| businessId | Long | Business ID associated with the entity that the report was requested for |
| requesterName | String | Name of client requesting the report |

In certain embodiments, the machine learning component 28 may return various response codes, other than response code 200 discussed above. The various response codes (other than response code 200) are generally indicative of a failure to accept/authorize the loan stacking request message and/or generate the requested loan stacking analytics report. Table 9, below, depicts the various responses codes that may be returned by the machine learning component 28, in accordance with an aspect of the invention.

TABLE 9

| Response Codes | | |
| --- | --- | --- |
| Code | Response | Description |
| 200 | OK | The Analytics request has been accepted and the results have been generated |
| 400 | Bad Request | Request was not formed correctly |
| 401 | Unauthorized Error | Authentication failed |
| 403 | Forbidden | The requesting client does not have access to the given CustomerID, or one or more of the AccountIDs given does not belong to the CustomerID given |
| 404 | Not Found | The requested resource could not be found but may be available in the future |
| 408 | Time out | Request timed out waiting for entity transaction data to be aggregated/retrieved. Subsequent requests may succeed once aggregation has completed |
| 409 | Conflict | Pre-conditions for request not met (e.g., FCRA compliance rules) |
| 503 | Service Unavailable | Service currently unavailable. The service may be available with later requests |

At operation 810, the machine learning component 28 retrieves, via the communications module 402, selected historical raw transaction data 804, such as a selected portion of the raw transaction data 26 (shown in FIG. 1), from one or more databases, such as the databases 20 (shown in FIG. 1). In an example embodiment, the machine learning component 28 pulls relevant raw transaction data 804 from the databases 20, wherein the relevant raw transaction data 804 is associated with the target entity identifier received in the loan stacking request message. Furthermore, in certain embodiments, the machine learning component 28 retrieves relevant raw transaction data 804 from only those accounts identified in the loan stacking request message and for the period specified in the loan stacking request message.

As noted above, if the loan stacking request message does not include a list of accounts and/or a specified period, the machine learning component 28 retrieves relevant raw transaction data 804 from all permissioned financial accounts associated with the target entity identifier for a default period of seven hundred and thirty (730) days. The selected raw transaction data 804 may be temporarily saved in a data table (not shown) for further manipulation. This operation may be referred to as the initial data load or data extract phase.

At operation 812, the machine learning component 28, via the model application engine 408, in a first instance applies a transaction categorization model to the selected raw transaction data 804 to infer and/or identify a category for each respective transaction, for example, from various features of each respective transaction. The machine learning component 28, via the data preparation engine 404, labels the respective transaction with the inferred/identified category. For example, and without limitation, each transaction may include one or more data elements or features indicative of a type of transaction, such as an ATM deposit, paycheck deposit, check deposit, wire transfer, mobile transfer, etc.

At operation 814, the machine learning component 28, via the model application engine 408, in a second instance applies an entity recognition model to the selected raw transaction data 804. More particularly, after application of the categorization model, the category labeled transaction data 804 is analyzed by the entity recognition model. The entity recognition model extracts and/or identifies an entity associated with each respective transaction and labels the respective transaction with the entity. For example, and without limitation, each transaction may include one or more data elements or features indicative of a transacting entity, such as a PayPal transaction, a bank transfer, a peer-to-peer (P2P) service (e.g., Venmo, Zelle, CashApp, etc.), employer, utility company, and the like.

At operation 816, the machine learning component 28, via the data preparation engine 404, generates one or more transaction groups or "streams" from the labelled (i.e., category and entity) raw transaction data 804. For example, and without limitation, the machine learning component 28 uses the transaction data 804 output by the entity recognition model and the categorization model to group similar transactions (e.g., electronic deposits, wire transfers, check deposits, etc.) or transactions from the same source (e.g., a lending organization, a bank, etc.) into one or more transaction streams. The machine learning component 28 also uses the categories from the categorization model to create engineered features and improve accuracy of the output.

At operation 818, the machine learning component 28, via the model application engine 408, applies the credit stacking classifier model 718 to each transaction stream of the one or more transaction streams generated in operation 816. The credit stacking classifier model 718 is trained on labelled transaction data using a supervised training technique, as discussed in more detail above. The credit stacking classifier model (such as a neural network algorithm) may be configured to use training examples provided in transaction training data during the training phase in order to learn how to predict which transactions and/or transaction streams indicate loan activity for an entity/business.

At operation 820, the machine learning component 28, via the results engine 410, determines a confidence score for each transaction stream analyzed by the credit stacking classifier model 718. More particularly, in the example embodiment, the results engine 410 may determine a confidence score for each respective transaction stream that is in a range between and including zero (0) and one hundred (100). A transaction stream with a confidence score above a selected threshold, such as fifty (50), may be classified as loan activity for the entity/business. It is noted that the confidence score range described above is only an example and that the confidence score range may be any desired range.

Optionally, the machine learning component 28, via the results engine 410, determines one or more of a cadence of each respective transaction stream, a status of each respective transaction stream, and/or transaction identifiers (IDs) for each respective transaction associated with each respective transaction stream. In the example embodiment, the cadence of a respective transaction stream includes a chronological rhythm identified or determine for the transactions that define the respective transaction stream. For example, a transaction stream that includes an entity's loan deposits may have a cadence of about fourteen (14) days, which may be indicative of loan stacking. The status of a transaction stream includes whether the particular transaction stream is "active" or "inactive." An "active" stream, as used herein, refers to a transaction stream in which the most recent deposit transaction in the transaction stream occurred as expected regarding the transaction stream's cadence and the next expected transaction date is in the future. If the above constraint is not met, the transaction stream is identified as being inactive. The transaction IDs of a transaction stream include a list of all the transaction IDs associated with all the transactions that define the respective transaction stream.

At operation 822, the machine learning component 28 predicts, via the results engine 410, loan stacking activity for the transaction analysis period (i.e., the optional selected period of transaction data or the default period) using the transaction streams determined to be "loan" activity. More particularly, the machine learning component 28 determines whether "loan" transactions have occurred within a two (2) week period. If such loan transactions have occurred, the results engine 410 predicts that loan stacking has occurred. Further, the machine learning component 28 determines whether two or more "loan" transactions have occurred in a period greater than a two (2) week period, and if so, determines a debt-to-income (DTI) ratio for the entity/business. To calculate the DTI of the entity, the results engine 410 retrieves the entity's total monthly revenue amount for the month(s) in which the loan transactions have occurred and its total monthly debt repayment amount, for example, by calling the revenue stream classifier model described above. The results engine 410 divides the total monthly debt repayment amount by the total monthly revenue amount to determine the DTI ratio. For example, if the entity/business has a total monthly revenue of twelve thousand dollars ($12,000) and a total monthly debt repayment amount of three thousand and five hundred dollars ($3,500), the DTI ratio is:

$$\frac{\$3,500}{\$12,000} = 0.292 \text{ or } 29.2\%$$

A DTI ratio of less than fifty percent (50%) is not determined to be indicative of loan stacking.

At operation 824, the machine learning component 28 receives, via the communications module 402, a get loan stacking report request message from the client computing device, such as a computing device 12. More particularly, the get loan stacking report request message includes a "Get Loan Stacking Analytics" API call to the machine learning component 28. The API call (i.e., the get loan stacking report request message) includes, for example, the report ID received in response to the loan stacking request message transmitted in operation 802, as depicted in Table 10 below.

TABLE 10

| | Path Variables | | |
|---|---|---|---|
| Variable | Type | Definition | Required |
| reportId | String | Analytics id returned when Generate Loan Stacking Analytics endpoint was called | Yes |
| | Query Parameters | | |
| Parameter | Type | Description | Required |
| purpose | String | Permissible purpose code | Yes |

In response to the get loan stacking report request message (if the request is successful), at operation 826, the machine learning component 28 transmits a report response message (e.g., report response code 200 described below) to the client computing device 12. The report response message includes, for example, the generated loan stacking analytics report of the target entity, including any predicted loan stacking activity for the transaction analysis period, which may be included as part of the accountResults object in the table below. More particularly, the machine learning component 28 returns the report response message including a plurality of data objects enclosed therein, as depicted below in Table 11 below.

TABLE 11

| | Response (code 200 Success) | |
|---|---|---|
| Key | Type | Description |
| reportId | String | The ID of the analytics generated by the request |
| customerId | Long | ID for the entity |
| title | String | Fixed - For example, "Cash Flow Analytics" |
| reportHeader | ReportHeader | Report metadata including business details, report ID, etc. |
| businessId | Long | ID for the Business |
| requesterName | String | Name of client who requested the analytics |
| businessSummary | BusinessSummary | Cash flow analytics metrics summarized/aggregated across all accounts included in the report |
| accountResults | List [AccountResults] | Cash flow analytics metrics for each individual account in the report |

In certain embodiments, the machine learning component 28 may return various response codes, other than report response code 200 discussed above. The various report response codes (other than report response code 200) are generally indicative of a failure to accept/authorize the loan stacking request message and/or generate the requested analytics report. Table 12, below, depicts the various responses codes that may be returned by the machine learning component 28, in accordance with an aspect of the invention.

TABLE 12

| | Response Codes | |
|---|---|---|
| Code | Response | Description |
| 200 | OK | OK, retrieved the analytics results |
| 400 | Bad Request | Request was not formed correctly |
| 401 | Unauthorized Error | Authentication failed |
| 403 | Forbidden | The requesting client does not have access to the given analyticsID |
| 404 | Not Found | The requested resource could not be found but may be available in the future |
| 409 | Conflict | The request was valid but could not be completed due to some failed prerequisite condition |

Example embodiments of systems and methods for training and applying machine learning models to predict an entity's/business's revenue stream and predict/identify loan stacking activities are described above in detail. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

For example, the methods may also be used in combination with other account systems and methods and are not limited to practice with only the transaction systems and methods as described herein. Rather, the example embodiment can be implemented and utilized in connection with many other data storage and analysis applications. While various specific embodiments have been disclosed, those skilled in the art will recognize that particular elements of one drawing in the disclosure can be practiced with elements of other drawings herein, or with modification thereto, and without departing from the spirit or scope of the claims.

Additional Considerations

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other such entity that can generate transactions with a cardholder account through a payment card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system comprising:

a database storing historical raw transaction data;

a machine learning component comprising a communications module, a data preparation engine, a modeling engine, a model application engine, and a results engine;

a processor; and a memory storing computer-executable instructions thereon, the computer-executable instructions, when executed by the processor, causing the processor to:

retrieve, via the communications module, a first set of raw transaction data from the database, the first set of raw transaction data including a first plurality of first transactions;

apply, via the model application engine, a transaction categorization model to the first set of raw transaction data, wherein the transaction categorization model infers a category from each first transaction of the first plurality of first transactions and labels each first transaction with the respective inferred category to generate a first set of category-labelled transaction data;

apply, via the model application engine, an entity recognition model to the first set of category-labelled transaction data, wherein the entity recognition model extracts an entity from each first transaction of the first set of category-labelled transaction data and labels each first transaction with the respective extracted entity to generate a first set of transaction training data;

impute, via the data preparation engine, missing values for the first set of transaction training data;

generate, via the data preparation engine, a plurality of first transaction streams from the first set of transaction training data, each respective first transaction stream including a group of first transactions that include one or more of the following: a same category label and a same entity label;

detect and remove, via the data preparation engine, one or more of the plurality of first transaction streams that are identified as outliers based on recent patterns in the transaction data;

determine, for each respective first transaction stream, whether the respective first transaction stream is indicative of a revenue stream or a non-revenue stream;

apply, via the data preparation engine, a revenue label to each first transaction stream and associated group of first transactions determined to be indicative of a revenue stream;

apply, via the data preparation engine, a non-revenue label to each first transaction stream and associated group of first transactions determined to be indicative of a non-revenue stream; and train, via the modeling engine, a supervised-based neural network using the plurality of labelled first transaction streams to generate a revenue stream classifier model.

2. The system in accordance with claim 1, said computer-executable instructions further causing the processor to:

detect one or more outlying transaction streams in the plurality of transaction streams by applying an outlier detection algorithm; and remove the one or more outlying transaction streams from the plurality of transaction streams.

3. The system in accordance with claim 1, said computer-executable instructions further causing the processor to:

receive a revenue request message from a client computing device, the revenue request message including a target entity identifier, the target entity identifier being associated with an entity having one or more financial accounts, the one or more financial accounts associated with a second plurality of second transactions;

retrieve, via the communications module, a second set of raw transaction data from the database, the second set of raw transaction data including the plurality of second transactions that span a predetermined period; and apply, via the model application engine, the revenue stream classifier model to the second set of raw transaction data.

4. The system in accordance with claim 3, said computer-executable instructions further causing the processor to:

generate a report identifier (ID) in response to the revenue request message; and transmit a response message to the client computing device.

5. The system in accordance with claim 4, said computer-executable instructions further causing the processor to:

apply, via the model application engine, the transaction categorization model to the second set of raw transaction data, wherein the transaction categorization model infers a category from each second transaction of the second plurality of second transactions and labels each second transaction with the respective inferred category to generate a second set of category-labelled transaction data;

apply, via the model application engine, the entity recognition model to the second set of category-labelled transaction data, wherein the entity recognition model extracts an entity from each second transaction of the second set of category-labelled transaction data and labels each second transaction with the respective extracted entity to generate a first set of transaction analysis data; and generate, via the data preparation engine, a plurality of second transaction streams from the first set of transaction analysis data, each respective second transaction stream including a group of second transactions that include one or more of the following: a same category label and a same entity label;

wherein applying the revenue stream classifier model to the second set of raw transaction data comprises applying the revenue stream classifier model to the plurality of second transaction streams.

6. The system in accordance with claim 5, said computer-executable instructions further causing the processor to:

generate, via the results engine, a confidence score for each second transaction stream of the plurality of second transaction streams, the confidence score representing a likelihood that a respective one of each second transaction stream is associated with revenue;

based on the confidence score for each second transaction stream, predict, via the results engine, a total revenue amount for the predetermined period; and transmit the predicted total revenue amount to the client computing device.

7. The system in accordance with claim 6, said computer-executable instructions further causing the processor to determine, via the results engine, one or more of the following: a cadence of each respective second transaction stream, a status of each respective second transaction stream, and a set of transaction identifiers (IDs) for each respective second transaction stream, wherein the cadence includes a chronological rhythm determined for the associated second transactions that define the respective second transaction stream, wherein the status includes whether the respective second transaction stream is active or inactive, and wherein the set of transaction IDs include a list of all the transaction IDs associated with all the second transactions that define the respective second transaction stream.

8. The system in accordance with claim 6, said computer-executable instructions further causing the processor to receive a get revenue report request message from the client computing device, the get revenue report request message including the report ID.

9. The system in accordance with claim 8, said revenue request message including a first application programming interface (API) call, and said get revenue report request message including a second API call.

10. The system in accordance with claim 8, wherein transmitting the predicted total revenue amount to the client computing device comprises transmitting a response message to the client computing device in response to the get revenue report request message, the response message including a cash flow analytics report for the target entity, the cash flow analytics report being associated with the report ID.

11. A method performed by a server, the method comprising:

retrieving a first set of raw transaction data from a database, the first set of raw transaction data including a first plurality of first transactions;

applying a transaction categorization model to the first set of raw transaction data, wherein the transaction categorization model infers a category from each first transaction of the first plurality of first transactions and labels each first transaction with the respective inferred category to generate a first set of category-labelled transaction data;

applying an entity recognition model to the first set of category-labelled transaction data, wherein the entity recognition model extracts an entity from each first transaction of the first set of category-labelled transaction data and labels each first transaction with the respective extracted entity to generate a first set of transaction training data;

imputing missing values for the first set of transaction training data;

generating a plurality of first transaction streams from the first set of transaction training data, each respective first transaction stream including a group of first transactions that include one or more of the following: a same category label and a same entity label;

detecting and removing one or more of the plurality of first transaction streams that are identified as outliers based on recent patterns in the transaction data;

determining, for each respective first transaction stream, whether the respective first transaction stream is indicative of a revenue stream or a non-revenue stream;

applying a revenue label to each first transaction stream and associated group of first transactions determined to be indicative of a revenue stream;

applying a non-revenue label to each first transaction stream and associated group of first transactions determined to be indicative of a non-revenue stream; and training a supervised-based neural network using the plurality of labelled first transaction streams to generate a revenue stream classifier model.

12. The method in accordance with claim 11 further comprising:

detecting one or more outlying transaction streams in the plurality of transaction streams by applying an outlier detection algorithm; and removing the one or more outlying transaction streams from the plurality of transaction streams.

13. The method in accordance with claim 11 further comprising:

receiving a revenue request message from a client computing device, the revenue request message including a target entity identifier, the target entity identifier being associated with an entity having one or more financial accounts, the one or more financial accounts associated with a second plurality of second transactions;

retrieving a second set of raw transaction data from the database, the second set of raw transaction data including the plurality of second transactions that span a predetermined period; and applying the revenue stream classifier model to the second set of raw transaction data.

14. The method in accordance with claim 13 further comprising:

generating a report identifier (ID) in response to the revenue request message; and transmitting a response message to the client computing device.

15. The method in accordance with claim 14 further comprising, applying the transaction categorization model to the second set of raw transaction data, wherein the transaction categorization model infers a category from each second transaction of the second plurality of second transactions and labels each second transaction with the respective inferred category to generate a second set of category-labelled transaction data;

applying the entity recognition model to the second set of category-labelled transaction data, wherein the entity recognition model extracts an entity from each second transaction of the second set of category-labelled transaction data and labels each second transaction with the respective extracted entity to generate a first set of transaction analysis data; and generating a plurality of second transaction streams from the first set of transaction analysis data, each respective second transaction stream including a group of second transactions that include one or more of the following: a same category label and a same entity label;

wherein applying the revenue stream classifier model to the second set of raw transaction data comprises applying the revenue stream classifier model to the plurality of second transaction streams.

16. The method in accordance with claim 15 further comprising:

generating a confidence score for each second transaction stream of the plurality of second transaction streams, the confidence score representing a likelihood that a respective one of each second transaction stream is associated with revenue;

based on the confidence score for each second transaction stream, predicting a total revenue amount for the predetermined period; and transmitting the predicted total revenue amount to the client computing device.

17. The method in accordance with claim 16 further comprising determining one or more of the following: a cadence of each respective second transaction stream, a status of each respective second transaction stream, and a set of transaction identifiers (IDs) for each respective second transaction stream, wherein the cadence includes a chronological rhythm determined for the associated second transactions that define the respective second transaction stream, wherein the status includes whether the respective second transaction stream is active or inactive, and wherein the set of transaction IDs include a list of all the transaction IDs associated with all the second transactions that define the respective second transaction stream.

18. The method in accordance with claim 16 further comprising receiving a get revenue report request message from the client computing device, the get revenue report request message including the report ID.

19. The method in accordance with claim 18, wherein the revenue request message includes a first application programming interface (API) call, and wherein the get revenue report request message includes a second API call.

20. The method in accordance with claim 18, wherein transmitting the predicted total revenue amount to the client computing device comprises transmitting a response message to the client computing device in response to the get revenue report request message, the response message including a cash flow analytics report for the target entity, the cash flow analytics report being associated with the report ID.

* * * * *